United States Patent [19]

Chelminski

[11] Patent Number: 4,939,704

[45] Date of Patent: Jul. 3, 1990

[54] METHOD, SYSTEM AND APPARATUS PRODUCING POWERFUL SEISMIC ENERGY IMPULSES BY IMPLOSION USEABLE IN WELLS IN THE EARTH

[76] Inventor: Stephen V. Chelminski, 63 Sidecut Rd., West Redding, Conn. 06896

[21] Appl. No.: 355,084

[22] Filed: May 18, 1989

Related U.S. Application Data

[63] Continuation of Ser. No. 191,768, May 4, 1988, abandoned, which is a continuation of Ser. No. 933,766, Nov. 21, 1986, abandoned.

[51] Int. Cl.$^5$ .............................................. G01V 1/40
[52] U.S. Cl. .................... 367/146; 181/106; 181/120
[58] Field of Search ............... 181/104, 106, 110, 113, 181/116, 117, 118, 119, 120, 142, 402; 367/25, 75, 83, 84, 143, 144, 146, 174, 911, 912

[56] References Cited

U.S. PATENT DOCUMENTS

| 3,277,437 | 10/1966 | Bouyoucos | 181/120 X |
|---|---|---|---|
| 3,403,374 | 9/1968 | Mellen et al. | 181/120 X |
| 3,433,202 | 3/1969 | Sharp et al. | 181/120 X |
| 3,721,311 | 3/1973 | Mott-Smith | 181/120 |
| 3,764,965 | 10/1973 | McLean et al. | 367/143 |
| 3,770,080 | 11/1973 | Laurent et al. | 181/120 |
| 3,895,687 | 7/1975 | McLaughlin, Jr. et al. | 181/120 |
| 4,042,063 | 8/1977 | Waters | 181/113 X |
| 4,153,135 | 5/1979 | Bouyoucos | 181/120 |
| 4,286,687 | 9/1981 | Fiske, Jr. | 181/119 X |

FOREIGN PATENT DOCUMENTS

0152099  8/1985  European Pat. Off. ............ 367/144

OTHER PUBLICATIONS

Renard et al., Simplon Water Gun, A New Implosion Type Seismic Source, Offshore Tech. Conf., vol. 1, 1974, pp. 773–777.

Primary Examiner—Brian S. Steinberger
Attorney, Agent, or Firm—Parmellee, Bollinger & Bramblett

[57] ABSTRACT

A method, system and apparatus for producing powerful seismic energy impulses by implosion of an imploding free piston positioned in a container which is adapted to be lowered down into a well in the earth to facilitate the collection of well surveying information about the geological formations of the earth in the vicinity of the well. Holding means maintain the imploding free piston in an initial position or quiescent state, trigger means suddenly release the holding means to cause the free piston to accelerate rapidly from its quiescent state thereby producing a powerful impulse by implosion, damping means arrest the movement of the imploding free piston, and operating means return the imploding free piston to its initial position after completion of its rapid acceleration and damped deceleration. After the imploding free piston is returned to its initial position, the apparatus may be triggered again, as desired, to produce additional powerful impulses by implosion. The self-contained apparatus includes a reversible electric motor and reversible hydraulic pump with first and second hydraulic-liquid-containing bladders. The first bladder transmits the powerful implosions into the ambient liquid in the well, and the second bladder serves as an expansible hydraulic reservoir and as an ambient pressure compensator for all operating parts including the motor. The operating means and the trigger means are hydraulically actuated; the imploding free piston is decelerated by hydraulic damping, and hydraulic liquid cools the motor.

41 Claims, 16 Drawing Sheets

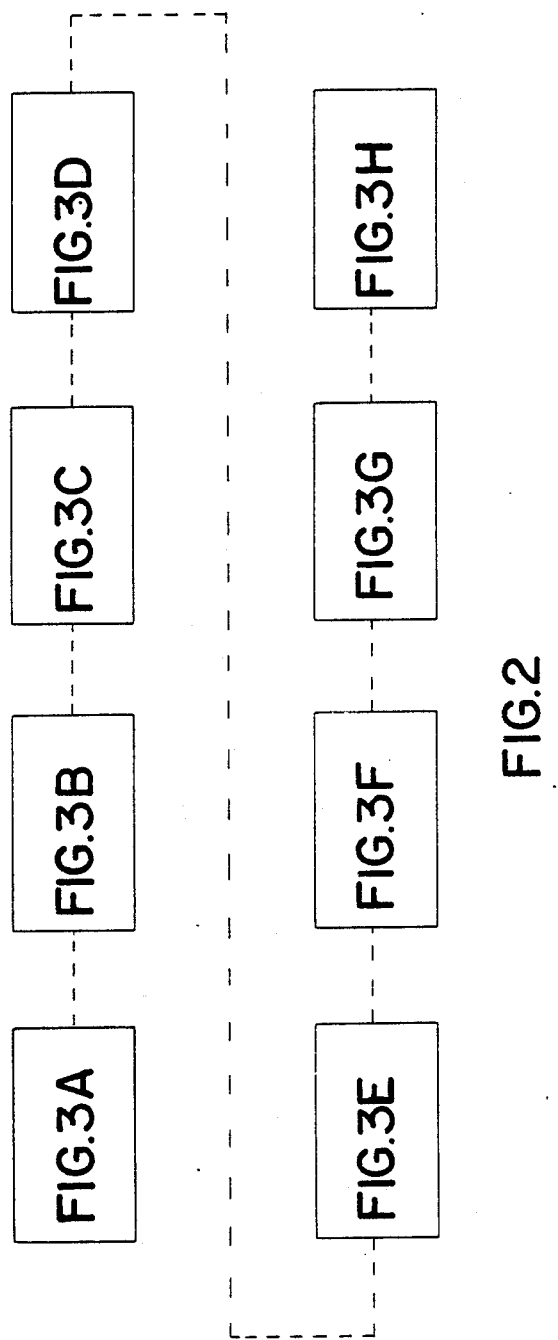

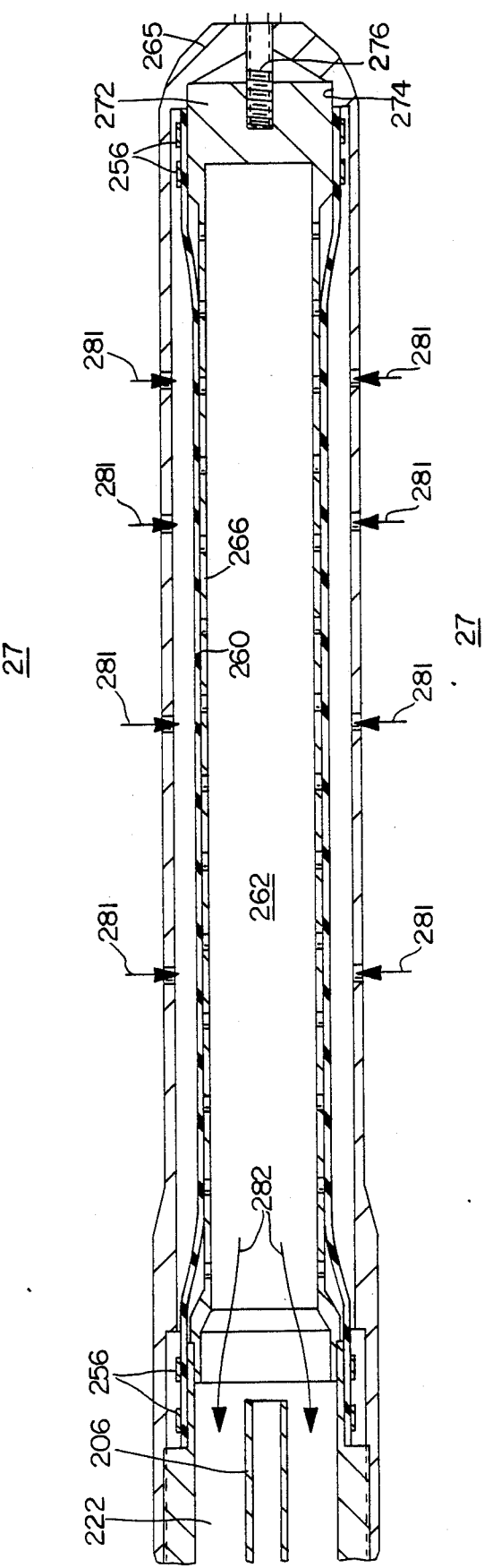

METHOD, SYSTEM AND APPARATUS PRODUCING POWERFUL SEISMIC ENERGY IMPULSES BY IMPLOSION USEABLE IN WELLS IN THE EARTH

This is a continuation of co-pending application Ser. No. 07/191,768 filed on May 4, 1988, which is a continuation of copending application Ser. No. 933,766, filed Nov. 21, 1986, now abandoned.

FIELD OF THE INVENTION

The invention is in the field of seismic energy sources and more particularly relates to such sources for use down in liquid-containing wells (or deep down in bodies of water) where the ambient liquid pressure is relatively high, for example, above about 500 pounds per square inch (p.s.i.) and usually considerably higher, or may be lower if desired.

BACKGROUND

The present invention relates to seismic energy sources for seismic surveying of the earth and more particularly to a method, system and apparatus for generating powerful seismic energy impulses inside of a well (or deep down in bodies of water) where the ambient liquid pressure is relatively high. The resulting seismic energy impulses penetrate through geological formations of the earth for detection by geophones, which can be advantageously arranged in any desired pattern, including being located in other wells, so that the electrical signals from the geophones may be recorded for analysis and/or processed with the objective of gaining information about the structure of the earth and often to determine the presence of possible oil and gas bearing regions. Also, if fluid is being used for treating a hydrocarbon deposit in the earth in the vicinity of a well in which the implosions are being generated, the electrical signals from the geophones may be processed for gaining information concerning the underground pattern of effects of such treatment throughout nearby regions of the deposit.

Due to the possibility of a "blowout" from the high pressure encountered down in oil or gas wells, it is undesirable with respect to many wells to release gaseous discharge products into the liquid or "drilling mud" inside of the well for fear of reducing the specific gravity of the liquid or "drilling mud" in the well column, thereby possibly unbalancing the pressure conditions in the well and rendering it unstable, leading to a blowout.

The imploder apparatus of the present invention takes advantage of the high pressures occurring down inside of a well containing liquid by utilizing such high pressure to implode a free piston.

SUMMARY OF THE DISCLOSURE

It is an object of the present invention to provide a powerful seismic energy impulse generating source which may be safely used inside a well without the accompanying danger of a blowout.

It is another object of the present invention to provide a self-contained seismic energy impulse generating source for use inside the well casing or bore of a well.

It is another object of the present invention to provide a practicable implosion method for generating a powerful seismic energy impulse useful for gathering information about the geological formation of the earth in the vicinity of a well.

It is another object of the present invention to provide a seismic energy impulse generating source which generates powerful seismic energy waves and does not discharge any material into the drilling mud or other liquid in the well column.

It is another object of the present invention to provide a powerful seismic energy impulse generating source which operates reliably and can be rapidly reset to repeatedly and consistently generate powerful seismic energy waves of like amplitude and frequency.

It is among the advantages of the present invention that it provides a method, system and apparatus employing a practicable powerful implosion-type impulse generating source, for example having an outside diameter (O.D.) of only 4.25 inches highly adapted for use down inside of a well or deep down in a body of water.

It is another advantage of the present invention that a method, system and apparatus are provided which facilitate rapid deployment at the well site.

It is a further advantage of the present invention that it provides a powerful seismic energy impulse generating source which can be readily and reliably remotely controlled from a relatively far distance.

It is another object of the present invention to provide a powerful seismic energy impulse generating source which is economical and relatively easy to deploy in a working well.

It is a further object of the present invention to provide a seismic energy impulse generating source which may be readily and rapidly reset within a well after firing to provide repeat capability.

It is a still further object of the present invention to provide seismic energy impulse generating imploder apparatus which utilizes a self-compensating hydraulic liquid pressure system and wherein the hydraulic liquid flow cools the pump motor.

Advantageously, the present invention also provides the capability to make a so-called "walkaway" Vertical Seismic profiling (VSP) Survey. In this regard, geophones may be positioned at the desired offset locations in the vicinity of the well head with the imploder apparatus located within the well and lowered or raised to various desired depths. Thus, time-consuming movements of the geophones into different offset locations may be eliminated since the geophones may already be positioned at the desired offset locations. Consequently, successive offset "shots" can be made as soon after each other as permitted by the recording time needed to receive the seismic energy impulses generated by the imploder apparatus, and the time needed to reposition the depth of the imploder apparatus in the well.

Advantageously, the present invention also enables seismic "tomography" types of surveying to be carried out. The imploder apparatus is repeatedly fired in a liquid-containing first well, while the geophones are arrayed in other wells around the first well in which the imploder is being fired. Thus, the seismic energy waves travel outwardly from the first well through the earth and are sensed by the various geophones in the array for providing information about structures and fluids in regions of the earth around the first well. The imploder apparatus is repositioned to various depths within the first well and is fired once or repeatedly at each depth.

Briefly, in accordance with the present invention a method, system and apparatus are provided for producing powerful seismic energy impulses in a liquid-containing well in the earth (or down in a body of water) where the ambient liquid pressure is relatively high by implosion of an imploding free piston positioned in a container. Holding means maintain the imploding free piston in an initial position or quiescent state, trigger means suddenly release the holding means to cause the imploding free piston to accelerate rapidly from its quiescent state thereby producing a powerful impulse by implosion, damping means then arrest the movement of the imploding free piston after completion of its rapid acceleration, and operating means return the free piston to its initial position. After the free piston is returned to its initial position, the apparatus may be triggered again, as desired, to produce additional powerful impulses by implosion.

BRIEF DESCRIPTION OF THE DRAWINGS

Other objects, aspects, features and advantages of the present invention will be apparent from the following detailed description of the presently preferred embodiments considered in conjunction with the accompanying drawings, which are presented as illustrative and are not intended to limit the invention. Corresponding reference numbers are used to indicate like components or elements throughout the various Figures.

FIG. 2 is a diagram for explaining how the respective sheets of FIGS. 3A through 3H are arranged end-to-end in sequence for showing the imploder apparatus of FIG. 1. To give the reader an appreciation for the actual size of this embodiment of the imploder apparatus of the present invention, it is noted that it has an O.D. of 4.25 inches (10.8 cm) and a length of about 26 feet.

In FIG. 3E for convenience of illustration and explanation this check valve and movable piston are shown in the same plane with the up or down flow passage.

FIG. 6 shows the free-moving imploding piston being returned by the operating piston to the initial position of the free-moving piston adjacent to a plurality of relatively powerful permanent magnet holding means.

FIG. 9 is a reduced size drawing of components shown in FIGS. 3G and 3H for explaining the imploding motion of the bladder within the lower end of the apparatus, which may be called the implosion-transmitting or firing bladder.

DETAILED DESCRIPTION OF PREFERRED EMBODIMENTS

The following detailed description sets forth presently preferred embodiments of the invention which are the best mode now known to the inventor for practising the invention.

Figure 1:
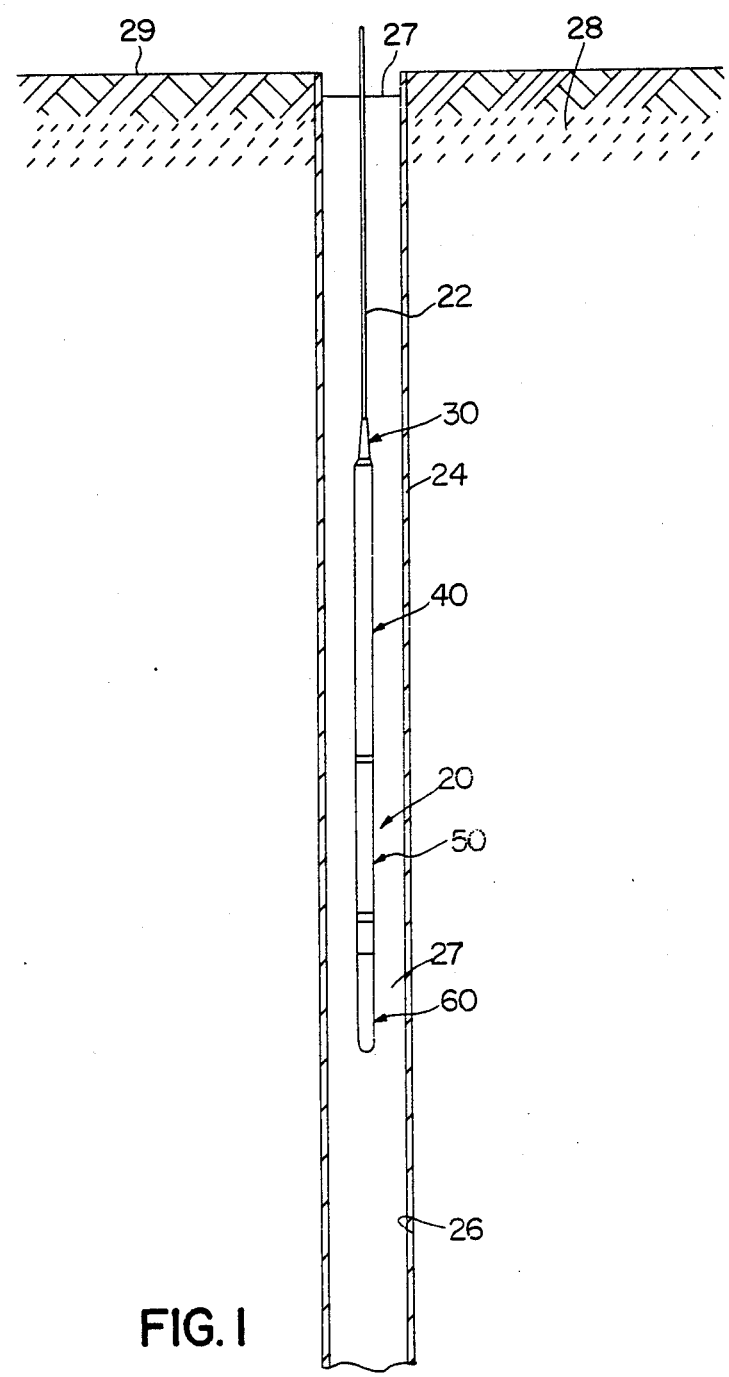
FIG. 1 is an elevational cross-sectional view of a seismic energy impulsion generating imploder apparatus in accordance with the present invention positioned in a liquid-containing well in the earth.

Referring to FIG. 1, an implosion generating seismic energy impulse source 20 in accordance with the present invention, and also referred to as imploder apparatus, is shown suspended by an electrical cable 22 within a well casing 24 of a deep well bore 26 in the earth 28. The electric cable 22 includes a sufficient number of individual insulated electrical conductors 23 (FIG. 3A) for conducting three-phase alternating current (A.C.) electrical power from a suitable source of electrical power (not shown) on the earth's surface 29 near the mouth of the well 26 down to a three-phase induction motor to be described later in the imploder apparatus 20.

The source of three-phase electrical power is adapted to have the cyclic direction of the three phases reversed for reversing the induction motor which drives a reversible hydraulic pump. Also, the three-phase electrical power source has a wattage or current meter for indicating the amount of electrical power being delivered to the induction motor for indicating the momentary amounts of mechanical power being delivered by the hydraulic pump, for reasons to be explained later. There are preferred to be two additional conductors 23 in the cable 22 for a circuit to a firing sensor 32 (FIG. 3A) which provides an electrical signal at the instant when the imploder apparatus 20 fires.

The electrical cable 22 contains stress members as known for down-well cables for providing the tensile strength necessary to support the weight of a long length of the cable itself plus the weight of the imploder apparatus 20. This cable 22 also has a protective sheath for withstanding the abrasion and severe, demanding conditions of usage.

When the imploder apparatus 20 is fired, as explained later, a powerful and sudden implosive pulse is generated in the ambient liquid 27 in the well 26. The resulting waves of seismic energy are transmitted from the well outwardly in all directions through the surrounding geological formations to be sensed by an array of geophones or hydrophones on the surface 29 and/or down in neighboring wells (not shown) for providing information about geological formations or hydrocarbon deposits or the status and locus of enhanced recovery procedures being performed within the deposits in the vicinity of the well 26. When geophones are positioned in neighboring wells, the seismic exploration technique may be referred to as "tomography-type" exploration.

From an overall view, the imploder apparatus as shown in FIG. 1 comprises generally: a cable clamp and connector section 30, an upper housing section 40, considered to be the electrical-power-to-hydraulic-power-conversion section, an intermediate housing section 50, considered to be the operating, triggering, and implosion-firing section, and a lower housing section 60, considered to be the implosion-transmitting section.

FIG. 2 illustrates how FIGS. 3A-H are arranged end-to-end in sequence for showing the whole imploder apparatus 20 which is about twenty-six feet in overall length and has an outside diameter of four and a quarter inches.

CABLE CLAMP AND CONNECTOR SECTION 30

Figure 3A:
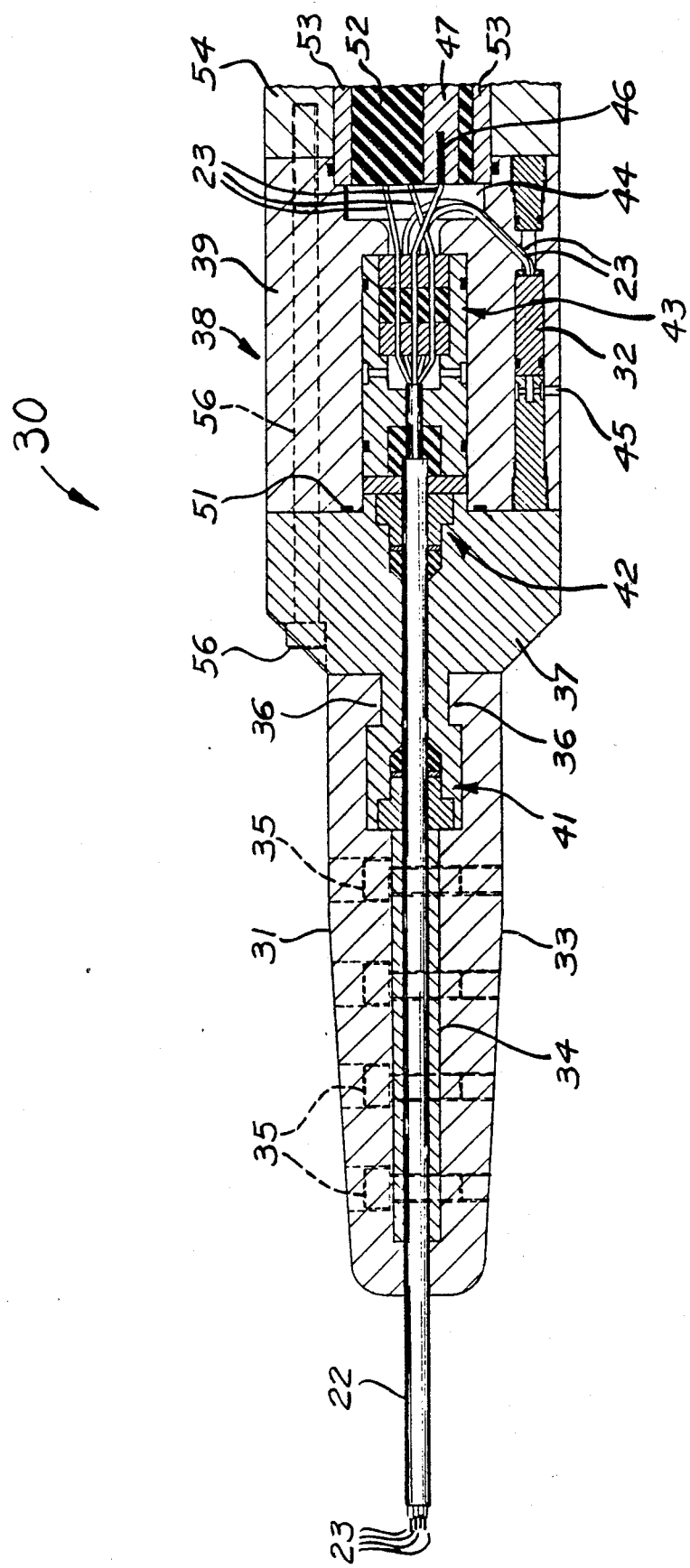
FIGS. 3A, 3B, 3C, 3D, 3E, 3F, 3G and 3H are axial sectional views of successive portions of imploder apparatus embodying the present invention. These successive portions are shown in order from top to bottom, as will be understood from their arrangement in FIG. 2.

FIG. 3A shows the cable clamp and connector section 30 in detail. There are a pair of cable clamp members 31 and 33 positioned on opposite sides of the cable 22 in encircling relationship and having gripping means 34 adjacent to the cable sheath. The clamp members 31 and 33 are removably secured together by a plurality of machine screws 35. These clamp members 31 and 33 have inturned shoulders 36 which engage and support a head portion 37 of a connector 38, having a main body 39.

The connector 38 includes a sequence of gasket and sealing assemblies 41, 42 and 43 for preventing ingress of the ambient liquid 27 into the interior 44 of the connector 38. The pressure of the ambient liquid 27 down in a well is relatively high, and so these gasket and sealing assemblies 41, 42, 43 are specially designed to block the entrance of high pressure liquid 27 into the connector interior 44. For further information regarding this connector 38 and the associated cable clamp 31, 33, the reader is referred to my copending patent application Ser. No. 896,395, filed Aug. 13, 1986.

Within the connector 38 a pair of the conductors 23 are electrically connected to the firing sensor 32. This firing sensor 32 is preferred to be of the type responding to sudden changes of pressure in ambient fluid, for example, preferably the type of sensor disclosed and claimed in U.S. Pat. No. 4,286,687—A. H. Fiske. This sensor 32 communicates with the ambient liquid 27 through a port 45 in the connector body 39.

Figure 3B:
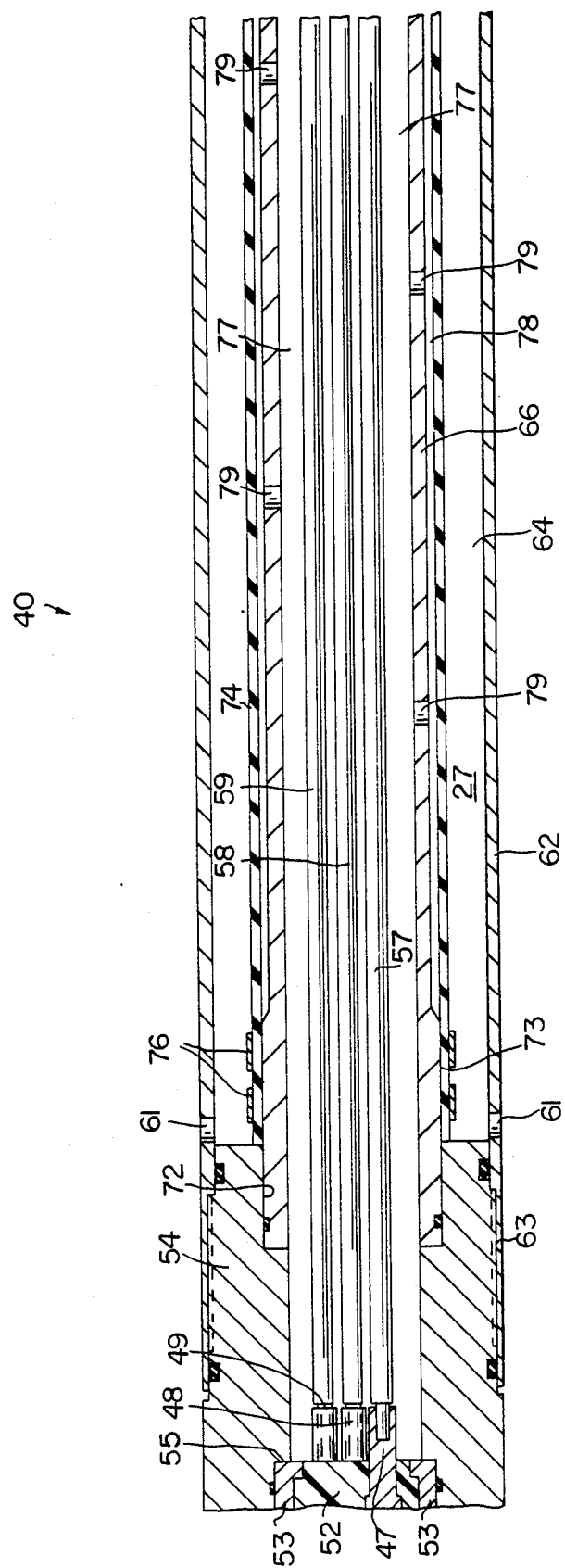
Figure 3C:
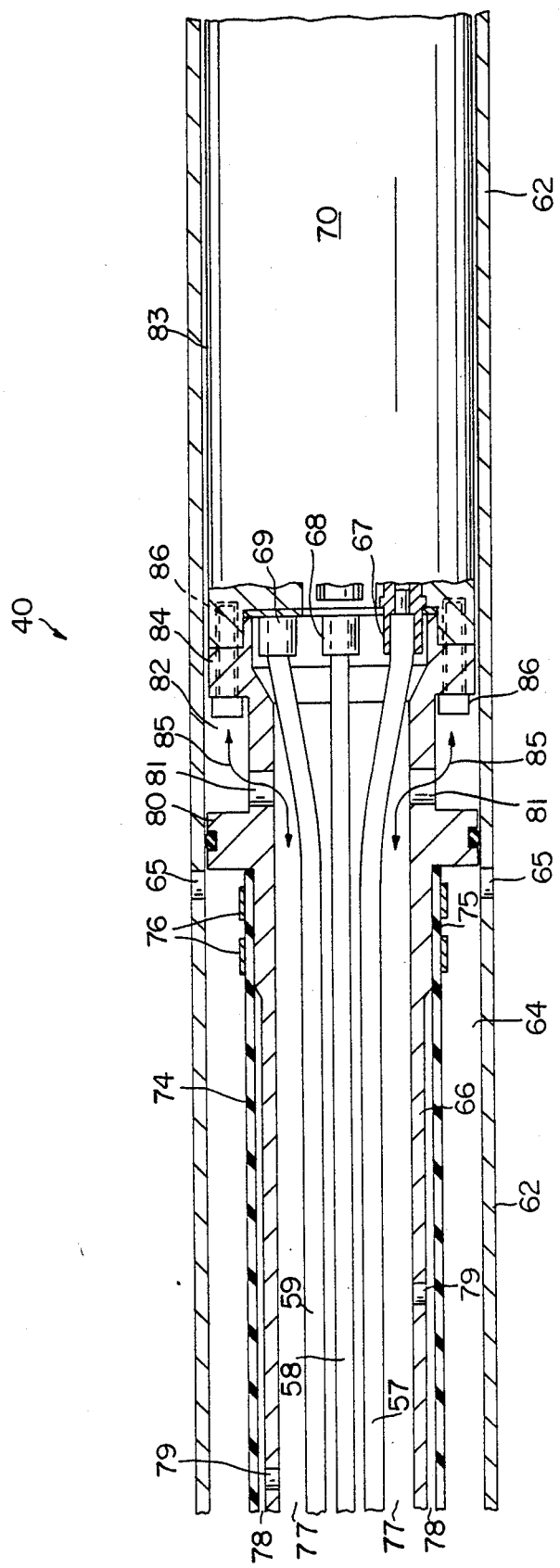
Figure 3D:
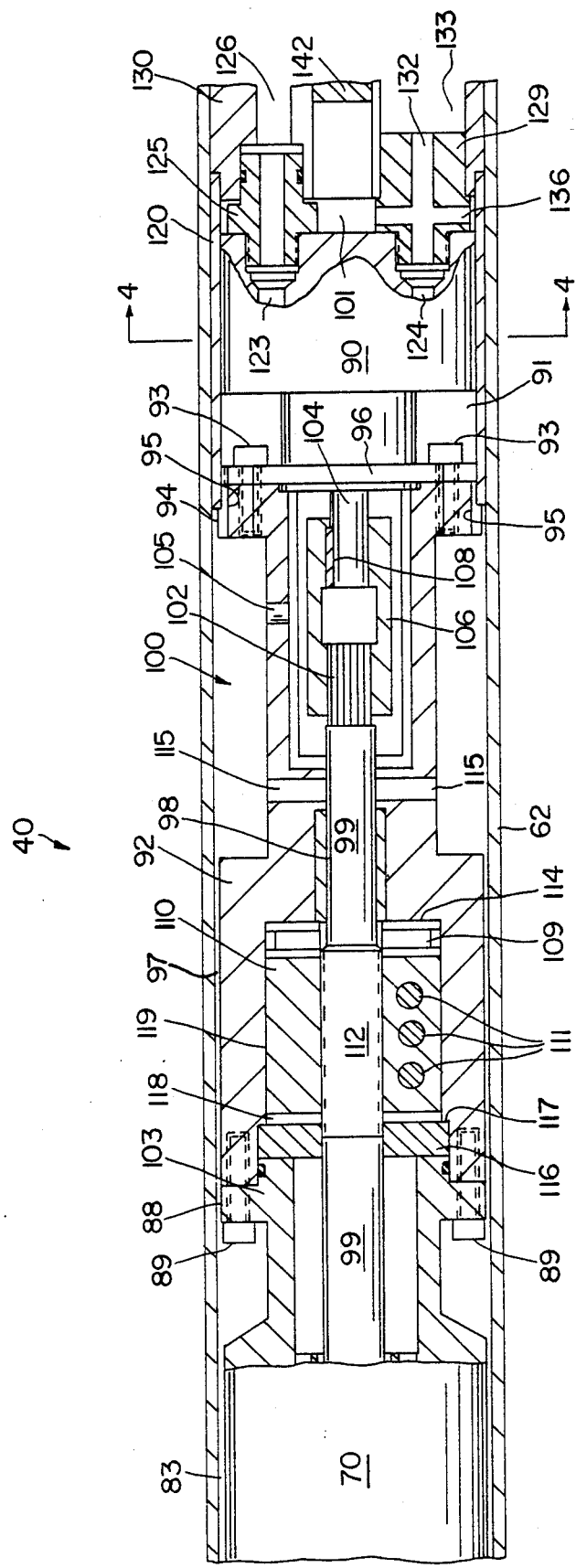

Also, within the connector 38 other ones of the conductors 23 are electrically connected, as shown at 46, to three conductor terminals 47, 48 and 49 (FIG. 3B). These three terminals 47, 48, 49 are mounted in sockets in a rigid insulator support 52 held by a metal sleeve 53 seated against an internal shoulder 55 within a hollow cylindrical top portion 54 of the upper housing section 40. The terminals 47, 48, 49, the insulator support 52 and the sleeve 53 comprise a three-phase electrical connector. Three electrical motor leads 57, 58 and 59 extend downwardly from these terminals 47, 48 and 49 to three motor terminals 67, 68 and 69 (FIG. 3C) of an elongated three-phase induction motor 70 (FIGS. 3C and 3D).

Inviting attention back to FIG. 3A, the head portion 37 of the connector 38 is secured in assembled relationship to the top portion 54 of the upper housing section 40 by a plurality of long machine screws 56 (only one is seen) extending through the main body 39 of the connector 38. It is to be noted that the assembly of the imploder apparatus 20 as a whole includes numerous O-rings associated with each static joint or seam that requires a sealed relationship. For example, an O-ring is shown at 51 associated with the joint between the connector head 37 and body 39. The purpose and use of such O-rings for sealing static joints and seams is well known and, therefore, the drawings and specification will not be burdened by describing the various O-rings of various sizes in various places. However, it is to be understood that such O-rings for sealing static joints and seams are important for proper assembly and operation. (Those particular O-rings which are associated with moving parts will be referenced and described.)

UPPER HOUSING SECTION 40

As shown in FIG. 3B, the upper housing section 40 includes a circular cylindrical casing 62 which is screwed at 63 onto the top portion 54 of this housing section 40. This casing 62 includes a plurality of upper ports 61 and a plurality of lower ports 65 (FIG. 3C), so that its interior region 64 adjacent to the casing 62 contains liquid 27 (FIG. 3B) at ambient pressure. The upper housing section 40 also includes an axially extending circular cylindrical tubular bladder support 66 whose upper end is removably received in a socket 72 in the housing top 54. A tubular expansible bladder 74 of elastomer material has its upper end secured to the tubular support 66 near the housing top 54 by a plurality of encircling hose clamps 76. The surface of the tubular support 66 in the local area 73 where the bladder 74 is clamped thereon is serrated by a fine thread (not shown) for enhancing the holding action of the hose clamps 76 and for sealing the interior of this bladder 74 which defines a reservoir 77 for holding a compensating volume of hydraulic liquid. It is noted that the insulated motor leads 57, 58 and 59 extend axially down through the hydraulic reservoir 77. The exterior surface of the tubular support 66 is reduced in outside diameter (O.D.) for most of the length of the reservoir 77 for providing an annular region 78 permitting expansion or contraction of the bladder 74, and a plurality of ports 79 in this tubular support 66 provide communication between the reservoir 77 and the annular region 78 which forms part of the reservoir 77.

The lower end of the reservoir bladder 74 (FIG. 3C) is clamped by hose clamps 76 onto a fine-threaded local area 75 of the tubular support 66 near the lower end of the reservoir 77. Adjacent to the lower end of the reservoir bladder, the tubular support 66 includes an annular shoulder or flange 80 sealed to the casing 62 for defining an annular chamber 82 adjacent to the casing wall 62 near the upper end of the motor 70. This shoulder or flange 80 also serves as centering means for holding the upper end of the motor 70 concentric within the casing 62. A flange 84 at the lower end of the tubular support 66 is secured to the top of the motor 70 by a plurality of machine screws 86.

In order to allow for hydraulic liquid flow 85, there is a small annular clearance 83 between the motor 70 and the casing wall 62 for permitting hydraulic liquid to flow upwardly and downwardly past the motor 70 and through ports 81 communicating with annular chamber 82 for cooling the motor and for providing communication between the reservoir 77 and a hydraulic pump 90 (FIG. 3D) which is driven by the motor 70, as explained later.

The motor 70 is a three-phase AC submersible, reversible induction motor. It is reversed in direction of rotation by reversing the cyclic direction of the three-phase electrical power being supplied to its terminals 67, 68 and 69. This motor 70 is about six feet long, and it has an outside diameter of three and three-fourths inches. It is commercially available from manufacturers of submersible oil well pumping equipment.

Advantageously, this submersible motor 70 is pressure-compensated by the hydraulic liquid and the reservoir bladder 74, because the annular region 64 surrounding the reservoir bladder 74 is at ambient pressure. Consequently, the hydraulic liquid in the reservoir 77, in the annular chamber 82 and in the annular region 83 surrounding the submersible motor and within the clearances of this submersible motor is at ambient pressure.

As shown in FIG. 3D, a thrust bearing and damper coupling assembly 100 is located between the lower end of the motor 70 and the hydraulic pump 90. The lower end of motor 70 has a flange 88 secured by machine screws 89 to a housing 92 for the assembly 100. The lower end of this housing 92 has a flange 94 connected by machine screws 93 to a flange 96 on the upper end of the pump 90.

In order to allow hydraulic liquid to flow past the flange 94, it has a plurality of through passages 95 communicating with an annular chamber 91 adjacent to the upper end of the pump 90. There is an annular clearance space 97 around the housing 92 adjacent to the casing 62 for allowing hydraulic liquid flow past the housing 92. The shaft 99 of the motor 70 extends down through the housing 92 passing through a sleeve bearing 98.

For coupling motor shaft 99 in positive drive relationship to the driven shaft 104 of the pump 90, there is a spline 102 on the lower end of the motor shaft engaging a coupling 106 which is keyed at 108 to the pump shaft 104. A radial port 105 allows hydraulic liquid to enter the housing 92 in the region around the coupling 106.

In order to support the weight of the motor shaft 99 and the rotor (not seen) of the motor 70 and to protect the rotor, the motor shaft 99 and its bearing from sudden axial jerks relative to the motor frame 103, there is a cylindrical damper piston 110 supported by a thrust bearing 109. This damper piston 110 is screwed onto a threaded portion 112 of the motor shaft 99. This damper member 110 has a radial slot (not seen) spanned by three clamp screws 111. Thus, the damper member is screwed onto the threaded region 112 to the desired axial location relative to the thrust bearing 109, and then the member 110 is securely clamped in place by tightening the screws 111 which serve to squeeze the member onto the threads 112. The thrust bearing 109 is seated on an internal annular shoulder 114 of the housing 92 of the assembly 100.

For providing the axial jerk damping action, there is a strong annular partition 116 encircling the motor shaft 99 immediately adjacent to the lower end of the motor frame 103. This partition 116 is held fixed in position captured between the motor frame 103 and an inner shoulder 117 in the housing 92. The space 118 between the partition 116 and the upper end of the damper piston 110 is filled with hydraulic liquid serving as a dash pot which damps any axial jerks by preventing any sudden displacement between the damper 110 and the partition 116. There is a small clearance space 119 inside of the housing 92 around the damper member. Hydraulic liquid enters the dash pot space 118 by passing through radial ports 115 in the housing 92, and through the porous sleeve bearing 98 past the thrust bearing 109 and through the small clearance 119 into the dash pot space 118.

From the above description, it will be understood that the shaft 99 of the motor 90 turns the coupling 106 which, in turn, drives the shaft 104 of the hydraulic pump 90. This pump is a bi-directional positive displacement hydraulic pump commercially available from Gresen Manufacturing Co., of Minneapolis, Minn. Pumps of various flow ratings may be used, depending upon the desired firing repetition rate of the imploder apparatus 20. It is preferred that the pump be rated for pumping against a pressure of at least 3,000 p.s.i.

Figure 3E:
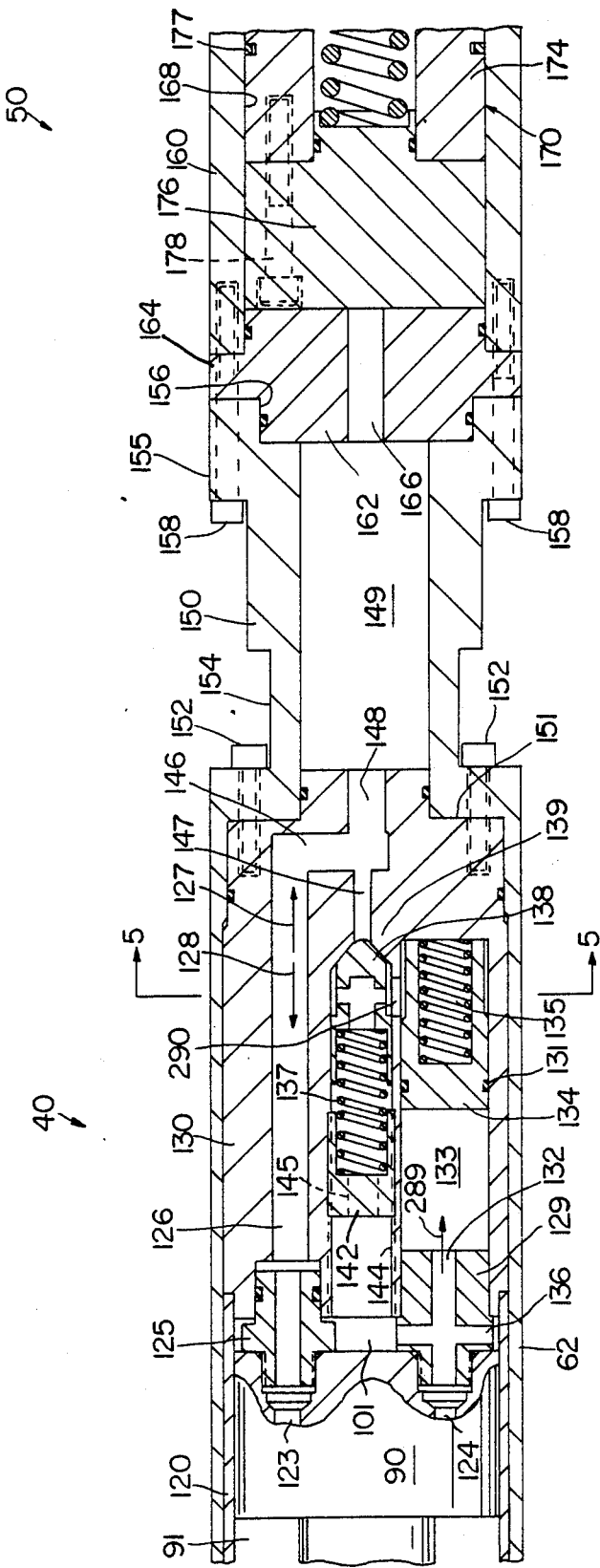
Figure 4:
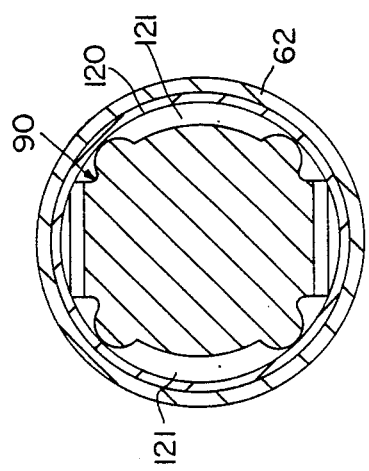
FIG. 4 is a cross-sectional view taken along the line 4—4 in FIG. 3D for showing the configuration of the reversible hydraulic pump positioned within the circular cylindrical housing of the imploder apparatus. Thus, hydraulic liquid can flow up and down within the housing past the pump.

As shown in FIG. 4, the cross-sectional outline of this hydraulic pump 90 is non-circular, thereby providing axial flow clearance spaces 121 extending past the pump 90 communicating with the annular chamber 91 (FIG. 3D) above the pump and with the region 101 (FIG. 3E) immediately below the pump. For holding the pump 90 in centered relationship within the main housing 62, there is a sleeve liner 120 encircling the pump 90 and seated against the housing wall 62. This sleeve liner 120 is captured between the flange 94 and an inlet/outlet passage member 130, seen fully in FIG. 3E. The pump 90 has first and second inlet/outlet ports 123 and 124, respectively. The first pump port 123 is connected through a liquid-tight coupling 125 with an operating passageway 126 within the inlet/outlet passage member 130. The coupling 125 is removably threaded into the pump port 123.

The second pump port 124 communicates through a liquid coupling element 129 removably screwed into the port 124 and having an axial passage 132 leading into a cylinder 133 containing a free-floating piston 134 having an O-ring piston ring 131 and which is biased by an associated spring 135 toward the coupling element 129. This free-floating piston 134 and spring 135 in cylinder 133 enable the motor 70 to start under low load when it is starting the pump 90 for pumping hydraulic liquid in an upward flow direction 128 through the operating passageway 126. For reasons to be explained later, it is more difficult to pump in the upward direction 128 than in the other direction 127. The coupling 129 includes a transverse passage 136 which communicates with the region 101 below the pump communicating through axial flow clearance spaces 121 (FIG. 4) with the chamber 91 at the top of the pump.

FLOW PATH FOR HYDRAULIC LIQUID BETWEEN PUMP 90 AND RESERVOIR 77

When the pump 90 is being rotated to produce downward flow 127 through the operating passage 126, the first pump port 123 is acting as the outlet port, and the second pump port 124 is acting as the inlet port drawing hydraulic liquid down from the compensating reservoir 77 (FIGS. 3B and 3C). The flow path from reservoir 77 proceeds out through the ports 81 (FIG. 3C) through the annular chamber 82, down through the clearance space 83 around the motor 70, down through the clearance space 97 (FIG. 3D) around the damper and coupling housing 92, down through the passages 95 in the flange 94, through the annular chamber 91, down through clearance spaces 121 (FIG. 4) past the pump into the region 101 below the pump and thence through the transverse coupling passage 136 leading through coupling 129 into the presently acting inlet port 124.

When the pump 90 is rotated in the direction to produce upward flow 128 through the operating passage, the first port 123 is acting as the inlet and the second port 124 is now acting as the outlet for delivering hydraulic liquid up into the reservoir 77. The flow out from port 124 now proceeds in the opposite direction from that explained in the preceding paragraph, namely through transverse passage 136 into region 101 below the pump, up through clearance spaces 121 (FIG. 4) past pump 90, through annular chamber 91, up through passages 95, up through clearance 97 past the housing 92, and up through clearance 83 past the motor 70, through annular chamber 82 above the motor, thence through ports 81 into the reservoir 77 within the bladder 74.

This bladder 74 expands when hydraulic liquid is being pumped up into the reservoir 77 and contracts when hydraulic liquid is being pumped down from the reservoir. Nevertheless, this bladder 74 is always being subjected to ambient pressure in the surrounding region 64 and thus is always maintaining the hydraulic pressure in the reservoir 77 and also at the second pump port 124 substantially equal to ambient pressure.

FURTHER DESCRIPTION OF UPPER HOUSING SECTION 40

Figure 3F:
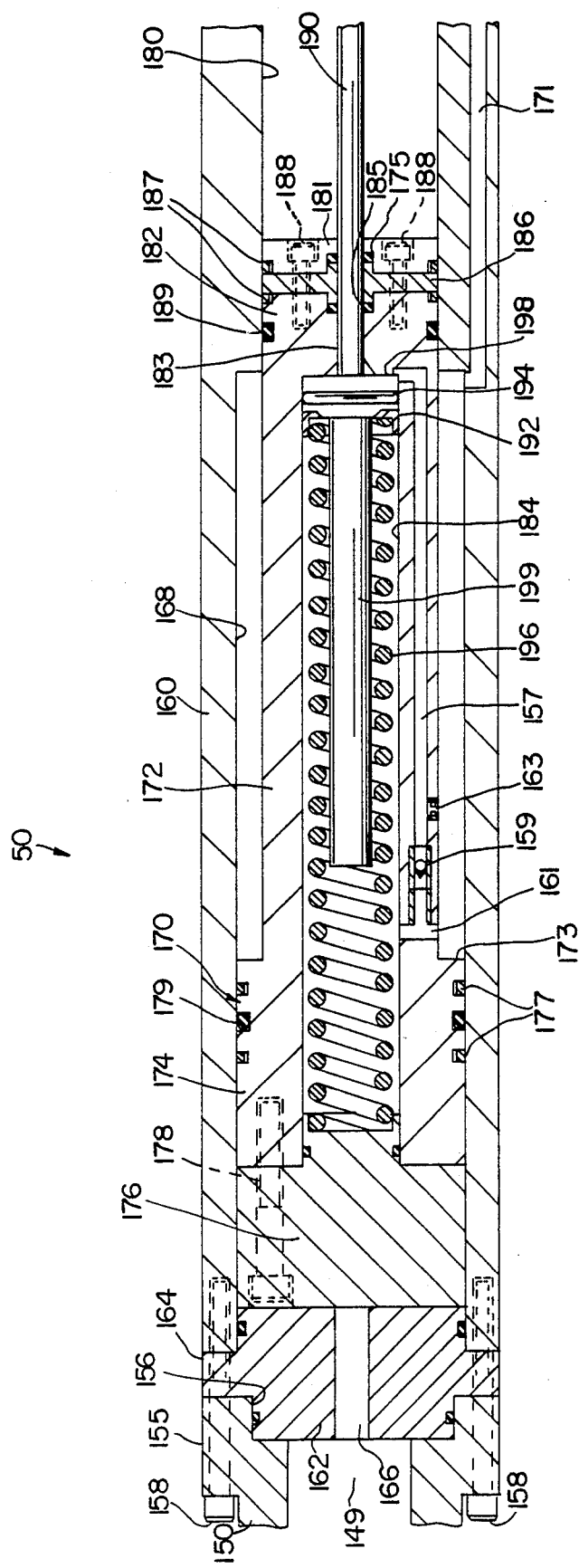
Figure 3G:
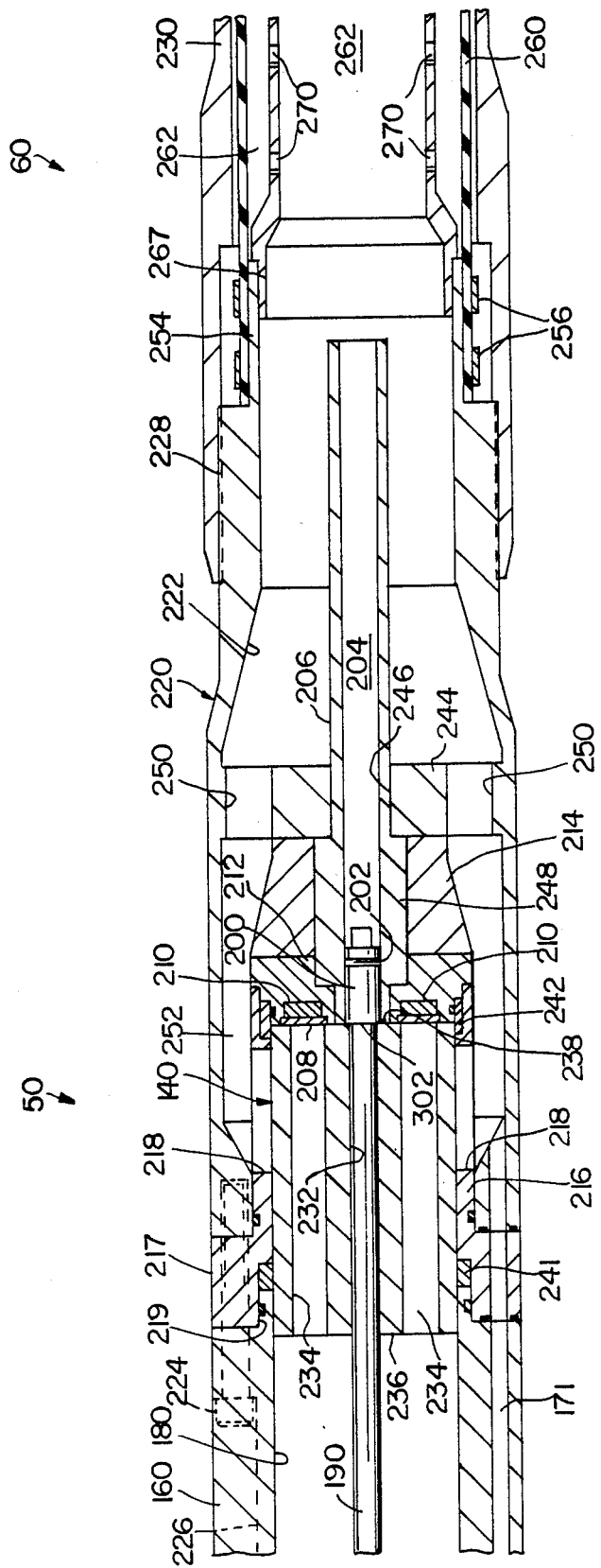
Figure 3H:
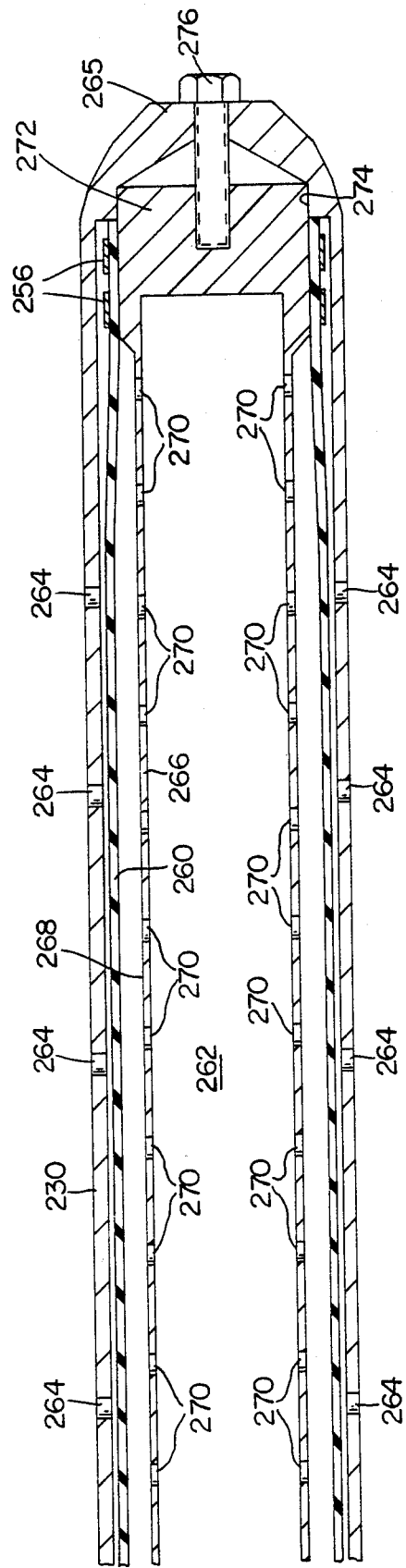
Figure 8:
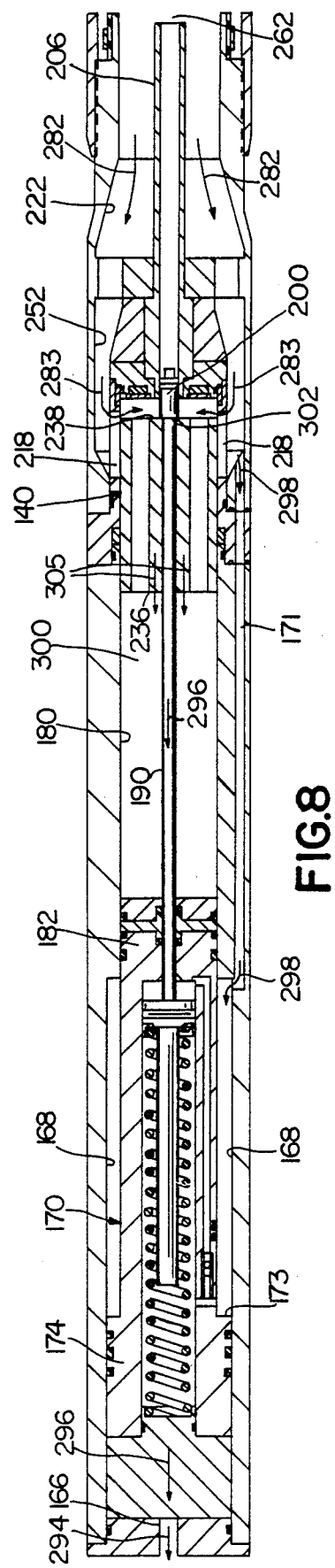
FIG. 8 is a reduced size drawing similar to FIGS. 6, 6A and 7 to show the trigger rod in the act of pulling the free-moving implosion piston away from its initial position.
Figure 8A:
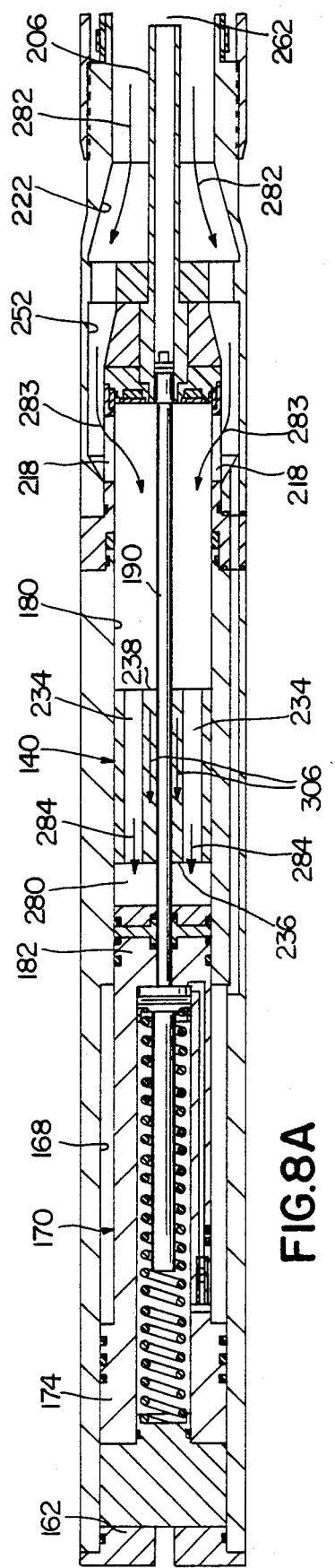
FIG. 8A shows the rapid imploding firing motion of the free-moving piston occurring immediately after the triggering action shown in FIG. 8.

In order to return a free-moving implosion firing piston 140 (FIG. 3G) to its initial or quiescent position, namely the position as shown in FIG. 3G, the pump 90 (FIG. 3E) is rotated by motor 70 in a direction for producing hydraulic flow in the downward direction 127 (FIG. 3E) through the operating passageway 126 for reasons explained later. In order to produce an empty cylindrical space into which the piston 140 can subsequently be caused to implode as shown in FIG. 8A, the pump 90 (FIG. 3E) is rotated in the opposite direction for producing hydraulic flow in the upward direction 128 through the operating passageway 126.

Within the passage member 130 is included a pressure relief valve 138 which is biased by a spring 137 down against its seat 139. The upper end of the spring 137 is seated in a spring holder 142 whose position can be adjusted by screwing along a threaded bore 144 for adjusting the desired pressure value at which the relief valve 138 will open.

Figure 5:
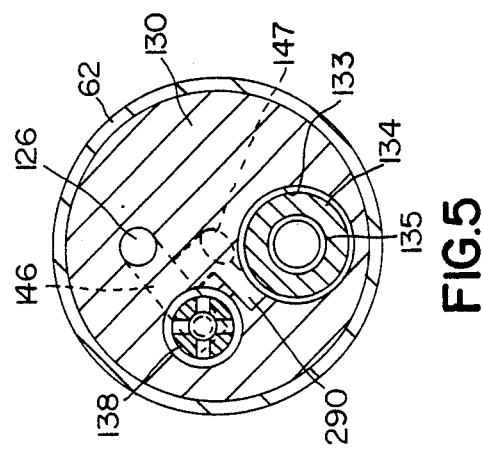
FIG. 5 is a cross-sectional view taken along the line 5—5 in FIG. 3E for showing the actual positions within the housing of a check valve, a movable piston and associated up or down flow hydraulic passage.

FIG. 5 shows the actual arrangement of the operating passage 126, the relief valve 138 and the low-load starting piston 134 and cylinder 133 within the passage member 130. In FIG. 3E this operating passage 126, relief valve 138 and cylinder 133 with piston 134 are shown side-by-side for clarity of illustration and explanation. The operating passage 126 communicates through a transverse passage 146 and an axial passage 147 (FIG. 3E) with the relief valve 138 and through another passage 148 leading into a chamber 149 in the lower end portion 150 of the casing 62 for the upper housing section 40. The passage member 130 is removably fastened to an internal annular shoulder 151 of the lower end portion 150 by a circle of machine screws 152, and this lower end portion 150 has an encircling channel 154 of reduced O.D. for providing access to these screws 152.

In order to obtain a full understanding of the assembly and disassembly of the upper housing section 40 as a whole and the convenience for doing so, the reader is asked to arrange FIGS. 3A through 3E (Sheets 3, 4, 5 and 6) end-to-end. By removing the screws 152 (FIG. 3E), the passage member 130 is now freed at shoulder 151 from its connection to the lower end portion 150 of the upper housing section 40. By removing the long machine screws 56 (FIG. 3A) from the connector 38, the top portion 54 of the upper housing section 40 is now freed to be rotated around the sleeve 53 of the three-phase electrical connector for unscrewing the threaded joint 63 at the top of the elongated casing 62, without twisting the motor leads 57, 58, 59 and without twisting the cable clamp and connector section 30 as a whole. There is sufficient slack in the motor leads 57, 58, 59 for permitting the joint 63 to be unscrewed, and the tubular bladder support 66 slides out of socket 72 (FIG. 3B). Now all of the internal components are freed from the casing 62 at the threaded top 63 (FIG. 3B) and at the internal shoulder 151 (FIG. 3E), and thus those internal components can all be slid out axially from the upper end of the casing 62. The passage member 130 (FIG. 3E) can be slid off from the couplings 125, 129 (FIGS. 3D and 3E) for disassembly of its internal components; and removal of screws 86 (FIG. 3C) at the top of the motor 70, removal of screws 89 at the bottom flange 88 of the motor, and removal of screws 93 at the pump top flange 96 permit complete disassembly of all components in the upper housing section 40.

INTERMEDIATE HOUSING SECTION 50

A flange 155 at the bottom of the upper housing section 40 contains a socket 156 and is connected by machine screws 158 to the casing 160 of the intermediate housing section 50. A cylinder head 162 seats in the socket 158 and fits sealed within the upper end of the casing 160. There is a flange 164 on this cylinder head 162 which is captured between the flange 155 and the upper end of the casing 160. An axial passage 166 through the cylinder head 162 provides communication between the hydraulic liquid chamber 149 and the upper end of an operating cylinder 168 containing an operating piston 170. This piston 170 includes a hollow cylindrical body 172 having a head 174 with a removable piston top 176 fastened to the head 174 by a plurality of machine screws 178, only one of which is shown. A plurality of piston rings 177 and an O-ring seal 179 encircle the piston head 174 in sliding contact with the cylinder wall 168.

The casing 160 has a lower portion with a thicker wall for defining a firing cylinder 180 (FIGS. 3F and 3G) having a smaller internal diameter (I.D.) than the operating cylinder 168. At the lower end of the piston body 172 there is a second or lower piston head 182 of smaller O.D. than the head 174 and having a plurality of encircling piston rings 187 plus an O-ring seal 189 in sliding contact with the cylinder wall 180.

In order to trigger the firing of the imploding firing piston 140 (FIG. 3G), there is a trigger rod 190 extending through an axial passage 183 (FIG. 3F) in the lower piston head 182 into the hollow interior of the piston body 172 which defines a retraction cylinder 184. For sealing the slidable trigger rod 190 in the axial passage 183 through the lower piston head 182 there is an O-ring seal 185, a piston ring 175, plus a retainer disc 186 secured by a removable piston head cover 181 held by machine screws 188.

Secured to the trigger rod 190 and located within the retraction cylinder 184, there is a retraction piston 192 (FIG. 3F) having an O-ring seal 194 in sliding contact with the retraction cylinder wall 184. A stiff compression spring 196 has one end seated in a socket in the piston top 176 and its other end seated in a socket in the retraction piston 192. This forceful spring 196 normally keeps the retraction piston 192 resting against the bottom 198 of the retraction cylinder 184. An upwardly extending end portion 199 of the piston rod 190 serves as a centering guide for the compression spring 196, which has a considerable spring constant, for example, a spring characteristic of about 100 per inch of deflection.

Figure 6A:
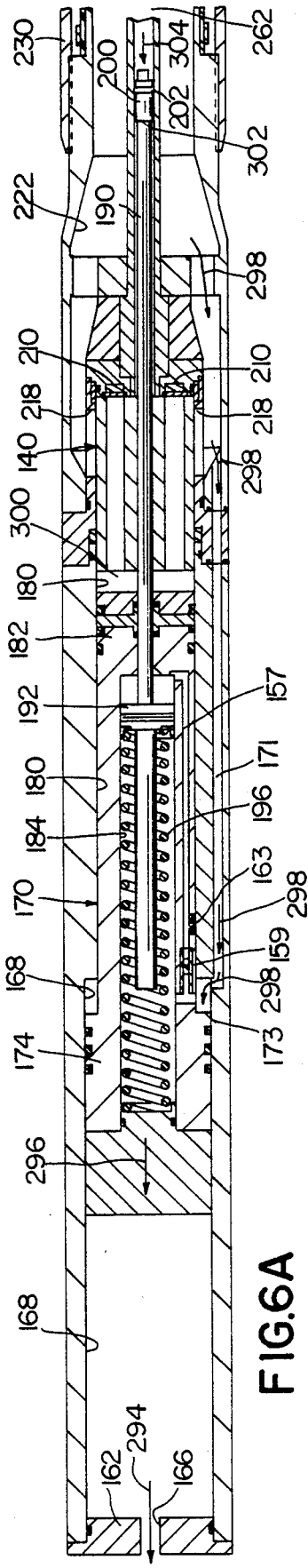
FIG. 6A is a drawing similar to FIG. 6 for showing the operating piston beginning to move upwardly toward its upper position, thereby beginning to draw a vacuum in the implosion firing chamber. Also, the trigger rod has been retracted a short distance upwardly into the operating piston in preparation for firing.
Figure 7:
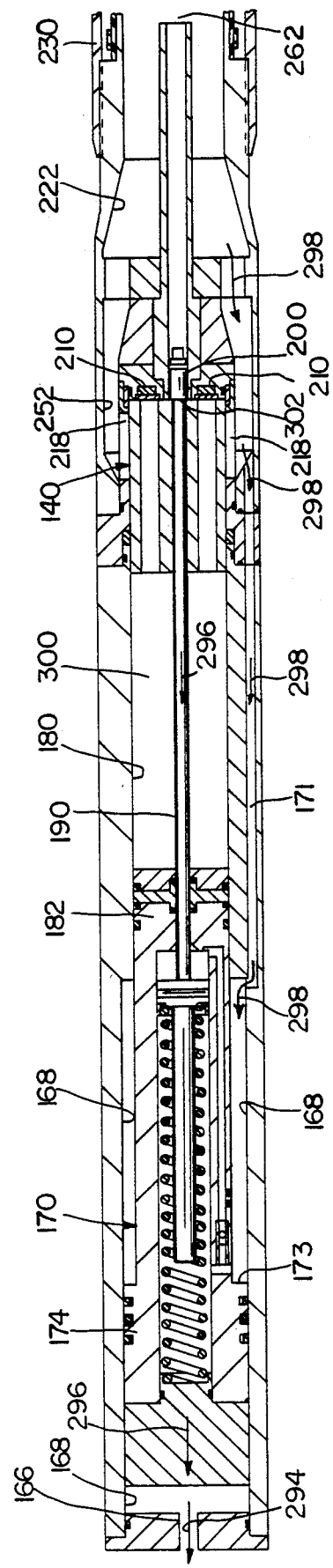
FIG. 7 is a reduced size drawing similar to FIGS. 6 and 6A for showing the triggering action of the trigger rod by which the free-moving imploding piston will be moved a short distance away from the permanent magnet holding means.

The purpose of the retraction piston 192 is to shorten the effective length of the trigger rod 190 for progressively shortening the length of travel of the implosion free piston 140 when operating at greater and greater depths in the well 26 where the ambient pressures in the liquid 27 become greater and greater. Thus, the free piston 140 is prevented from accelerating to such an unduly high velocity that damage might result to the associated components. There is a retraction passage 157 in the body 172 of piston 170 leading in the axial direction from a check valve 159 to the bottom 198 of the retraction cylinder 184. There is a transverse passage 161 providing communication between the interior of operating cylinder 168 and the interior of the retraction cylinder 184. This transverse passage 161 also communicates with the check valve 159, which permits flow from the transverse passage 161 into the retraction passage 157, but it prevents flow in the reverse direction from the retraction passage 157 into the passage 161. Consequently, when the piston 192 has been retracted away from the cylinder bottom 198, as shown in FIGS. 6A, 7 and 8, this check valve 159 prevents the retracted piston 192 from being pushed down to the bottom 198 by the spring 196.

In order to allow the retracted piston 192 to be pushed slowly down by the spring 196 toward the cylinder bottom 198, there is a small orifice 163 providing communication from the retraction passage 157 into the cylinder 168.

For pushing the operating piston 170 upwardly toward the cylinder head 162, there is a return passageway 171 extending in an axial direction in the casing 160 from the upper region 252 (FIG. 3G) of the throat 222 into the lower end of the operating cylinder 168. This return passageway 171 serves to feed hydraulic liquid at ambient pressure into the operating cylinder 168 in the region below the lower annular surface 173 of the piston head 174. Consequently, hydraulic liquid at ambient pressure is present in the operating cylinder 168 below the piston head surface 173 for continuously urging the piston 170 toward the cylinder head 162.

As shown in FIG. 3G, the lower end of the trigger rod 190 has an attached trigger piston member 200 with an O-ring seal 202 in sliding contact with the bore 204 of a guide tube 206. This trigger piston member 200 serves to trigger the implosion firing piston 140 away from its initial or quiescent position shown in FIG. 3G and also serves to seal the firing cylinder against entrance of hydraulic liquid through the bore 204 of tube 206.

In order to retain the implosion firing free-moving piston 140 in its initial position as shown in FIG. 3G, there are a plurality of high flux density permanent magnets 210, for example of ceramic magnetic material, held by a retainer 208 of non-magnetic material in an annular member 212 forming the bottom of the firing cylinder 180. This cylinder bottom member 212 encircles the upper end of the guide tube 206 and is captured between an annular retainer 214 and a cylinder sleeve 216 containing a plurality of firing ports 218. The cylinder sleeve 216 forms an extension of the cylinder 180 and has a flange 217 containing a socket 219 which receives a lip on the lower end of the casing 160.

For mounting the lower housing section 60 to the intermediate housing section 50, there is a transition member 220 of generally cylindrical configuration having a firing throat 222. The upper end of this transition member 220 is attached by machine screws, one of which is shown at 224, to the lower end of the casing 160 of the intermediate section 50. A recess 226 in the casing 160 is provided to give access to the head of each machine screw 224. The lower end of the transition member 220 is removably connected by screw threads 228 to the circular cylindrical casing 230 for the lower housing section 60.

Inviting attention to the free-piston 140, it has a circular cylindrical configuration with an axial bore 232 having sliding clearance with the trigger rod 190. There are a plurality of liquid-flow passages 234 extending axially through this free piston between its upper end 236 and its lower end 238. A first annular firing seal 241 encircles the free piston 140 in sealing relationship with the circumferential surface of the piston above the firing ports 218, and a second annular seal 242 encircles the free piston in sealing relationship with its circumferential surface adjacent to the lower end 238. These seals 241 and 242 are held by the cylinder sleeve 216 which forms an extension of the firing cylinder 180.

In order to hold the annular retainer 214 which, in turn, holds the cylinder bottom 212 and also to hold the guide tube 206, the transition member 220 has a spider 244 extending across its firing throat 222. The guide tube projects through a central mounting hole 246 in the spider 244, and a shoulder 248 on the guide tube 206 is captured between a socket in the cylinder bottom 212 and the upper surface of the spider. There are a plurality of ports 250 in the spider for providing communication between the upper and lower regions of the firing throat 222. It is to be noted that the upper region 252 of the firing throat 222 is generally annular in configuration and encircles the whole lower end of the firing cylinder sleeve 216 and also encircles the firing ports 218.

LOWER HOUSING SECTION 60

As described above, the casing 230 of the lower housing section 60 is removably connected to the intermediate housing section 50 by the transition member 220, which has an assembly or disassembly screw threaded connection 228. Below this threaded region 228, the transition member 220 (which may also be called the firing throat member) has a cylindrical bottom skirt 254 on which is mounted a firing bladder 260 secured by encircling hose clamps 256. This tubular firing bladder 260 is a containment barrier to keep harmful ambient fluids and abrasive gritty materials away from the free piston 140, and also it serves to transmit powerful implosions from the hydraulic liquid in the interior 262 of this firing bladder into the ambient liquid 27 in the well. For transmitting each implosion pulse through the wall of the casing 230, there are a plurality of implosions transmitting ports 264. It is my present thinking that it is advantageous to have these ports non-uniformly spaced, being progressively closer together in the axial direction toward the lower end or nose 265 (FIG. 3H) of the casing 230. For controlling the implosion of the firing bladder 260, a tubular cylindrical bladder support 266 extends axially within the bladder chamber 262 and has a reduced O.D. surface 268 along substantially the entire length of the tubular support 266 for allowing contraction of the bladder 260. The upper end of the tubular support 266 is held by its rabbeted end 267 (FIG. 3G) fitting into the skirt 254 at the lower end of the firing throat member 220. The lower end of this tubular support 266 has a bottom end wall 272 seating in a socket 274 in the nose 265 and held by a machine screw 276. Encircling hose clamps 256 (FIG. 3H) secure the lower end of the firing bladder 260 to the tubular support 266 near its bottom wall 272.

For transmitting implosions from the interior 262 of the tubular support 266 to the bladder 260, there are numerous apertures 270 in the wall of the support 266. These apertures are relatively small and are shown uniformly spaced in the axial direction.

Figure 10:
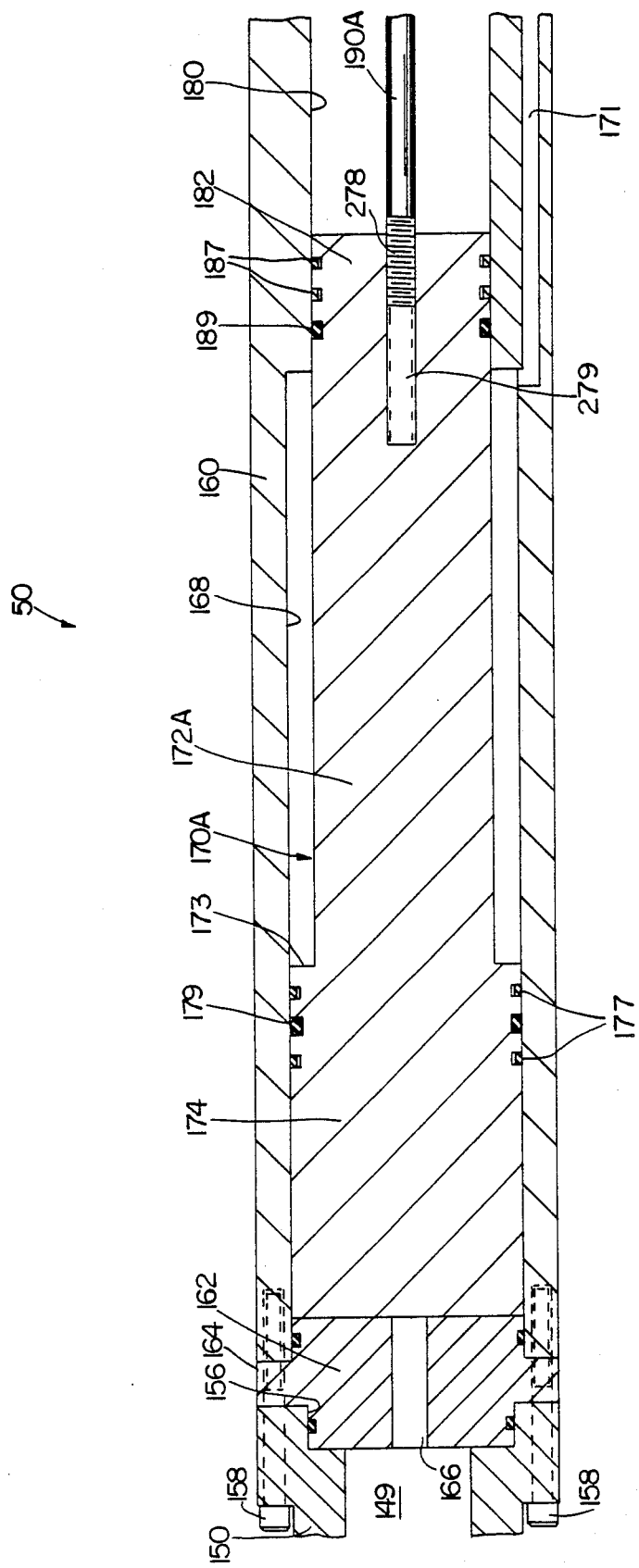
FIG. 10 corresponds with FIG. 3F and shows a modified embodiment of the operating piston and a portion of the triggerrod.

In FIG. 10, there is shown a modified embodiment of the operating piston 170 (FIG. 3F) and of the trigger rod 190 (FIG. 3F). In FIG. 10, the operating piston 170A is directly affixed to the upper end 278 of the trigger rod 190A. This upper end 278 of rod 190A is threaded and is screwed into a threaded socket 279 in the bottom end of the second or lower piston head 182. The remainder of the piston rod 190A is identical to that shown in FIG. 3G. The cylindrical body 172A of the piston 170A does not contain the retraction cylinder and associated components, because the trigger rod 190A is directly affixed to the operating piston 170A and is not retracted in length.

OPERATION

In explaining the operation of the imploder apparatus 20, the firing sequence will be assumed to have just occurred, and so the imploding free piston 140 has imploded suddenly (arrows 306, FIG. 8A) up to a position near the upper end of the firing cylinder 180. This implosion piston 140 does not reach the top of the firing cylinder 180, because the damping passages 234 have advantageously enabled hydraulic liquid to rush (arrows 284) through these passages into the head space 280 at the upper end of the firing cylinder 180, thereby hydraulically damping, decelerating and arresting this fast-moving free piston 140.

For clarity of illustration and explanation, many of the reference numbers shown in FIGS. 3F and 3G are omitted from FIG. 8, so that attention is focused on what is occurring.

The operating piston 170 is shown at the upper end of its operating cylinder 168. If the trigger rod 190 had been retracted so that its effective length would have been shortened, then the operating piston 170 would be spaced downwardly a distance from the cylinder head 162. The shorter the effective length of trigger rod 190, the further the operating piston 170 would be spaced from the cylinder head 162 and the shorter the effective length of the firing cylinder 180 and consequently the shorter the firing stroke of the imploding piston 140.

As shown in FIG. 9, the sudden implosion of the free piston has occurred because the relatively high pressure of the ambient liquid 27 (FIG. 1) was suddenly permitted, as shown by the flow arrows 281 in FIG. 9, to rush in through the ports 264 (FIG. 3H) to collapse suddenly the impulse-transmitting or firing bladder 260 inwardly toward its tubular support 266. This sudden inward collapse of the firing bladder 260 has surged hydraulic liquid from the chamber 262 within the bladder upwardly through the firing throat 222, as shown by the arrows 282 in FIG. 9.

This surge 282 (See also FIG. 8A) of hydraulic liquid rushes up through the throat 222 and through the upper region 252 (FIG. 8A) of the firing throat 222 and surges inwardly (arrows 283) through the firing ports 218 to drive the free piston 140 suddenly upwardly along the firing cylinder 180, arrows 306 in FIG. 8A. Then, as explained above, some of the hydraulic liquid has rushed ahead (arrows 284) through the liquid-flow passages 234 in the imploding piston 140 to enter the head space 280, thereby damping, decelerating and stopping the piston. The firing sequence is concluded.

The return sequence will now be explained, to return the free piston 140 from its fired position in FIG. 8A to its initial position as shown in FIG. 3G adjacent to the holding means formed by the permanent magnets 210. The free piston is made of material having a high susceptibility to magnetic flux, i.e. being ferromagnetic in character, so that it can be held by the magnets 210.

In order to return the free piston 140 to its initial position, the pump 90 (FIG. 3E) is driven in the direction for pumping hydraulic liquid down (arrow 127 in FIG. 3E) through the operating passageway 126. This downward flow of hydraulic liquid passes down through the passages 146, 148 (FIG. 3E) and down through chamber 149 and down through the axial passage 166 in the cylinder head 162 to enter the top of the operating cylinder 168. This downward flow of hydraulic liquid entering the operating cylinder 168 is shown by the arrow 285 in FIG. 6. The flow 285 of hydraulic liquid into the operating cylinder 168 pushes (arrows 286) the operating piston 170 downwardly (arrow 287, FIG. 6). Thus, the lower end 181 of the operating piston pushes the free piston 140 back down to its initial position as shown in FIG. 6 near the magnets 210 to be held there by these magnets.

Figure 6:
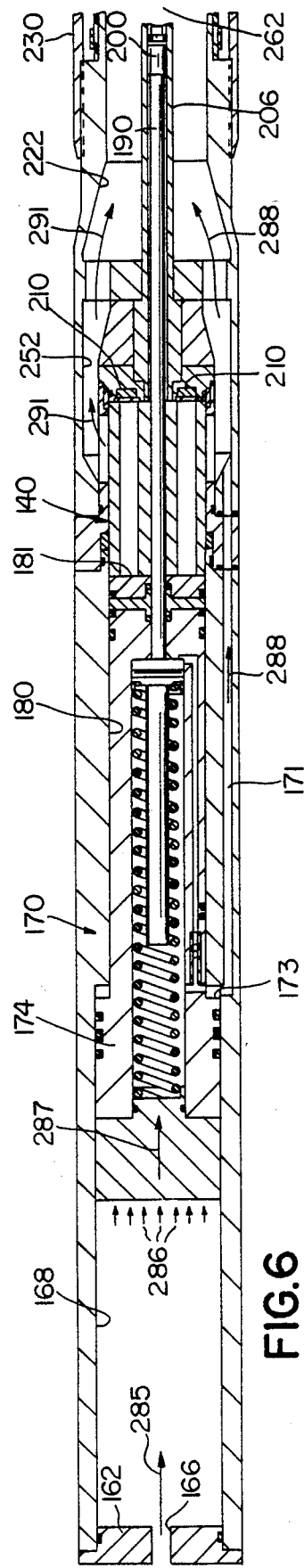
FIG. 6 is a reduced size drawing of components shown in FIGS. 3F and 3G for further explaining operation of these components of the imploder apparatus.

When the operating piston 170 has completed its downward (free-piston-restoring) stroke as shown in FIG. 6, the flow 285 of hydraulic liquid through passage 166 into the operating cylinder 168 stops, because no more room is available in cylinder 168, and consequently the pressure in chamber 149 (FIG. 3E) immediately rises, thereby causing the pressure relief valve 138 (FIG. 3E) to lift off from its seat 139. The increase in pressure in chamber 149 imposes an increase in load on the pump 90 causing the motor 70 to draw more electrical power, thereby signalling that the restoring stroke of the operating piston 170 has been completed. When this relief valve 138 lifts from its seat 139, the liquid is then permitted to flow through passages in the relief valve itself and up through an axial passage 145 in the spring holder 142 and thence into the region 101 below the pump 90.

It is noted that while the operating piston 170 was descending (arrow 287 in FIG. 6) in its free-piston-restoring stroke, the passage 171 allowed hydraulic liquid to exit (flow arrow 288) from the lower end of the operating cylinder 168 below the descending piston surface 173. This exiting liquid flow 288 through passage 171 enters the top portion 252 of the throat 222 and thence down into the bladder chamber 262 (FIGS. 3G and 3H) which is now advantageously serving as a volume displacement compensating chamber.

Also, it is to be noted that while the operating piston 170 was descending (arrow 287 in FIG. 6, the hydraulic liquid in the firing cylinder 180 exited as shown by the arrow 291 through the firing ports 218 into the top portion 252 of the throat 222 and thence down through the throat into the bladder chamber 262. The cross-sectional area of the piston 174 (or cylinder 168) equals the sum of the cross-sectional areas of piston 182 (or cylinder 180) plus the area of annular piston shoulder 173. Therefore, the volume flow 285 per unit time entering the operating cylinder 168 equals the sum of the two volume flows 288 and 291 per unit time exiting respectively from the lower portion of the operating cylinder beneath the piston shoulder 173 and from the firing cylinder 180. These volume flows per unit time are occurring essentially at ambient pressure. In other words, hydraulic pressures are essentially balanced on the input 124 and output 123 of the pump 90, and consequently the pump 90 performs only a very modest amount of mechanical work in overcoming frictional losses and flow losses during the downward stroke 287 of the operating piston assembly 170, 174, 182 when restoring the firing piston 140 to its initial position. Thus, the bladder 260 serves at least four functions: (a) it transmits the powerful implosions as shown in FIG. 9; (b) it acts as a volume displacement compensating chamber for hydraulic liquid flow through passage 171 as described immediately above; (c) it normally subjects to ambient liquid pressure the hydraulic liquid in the passage 171 and also in the lower portion of the operating cylinder 168 below the piston head bottom surface 173; and (d) it keeps out contaminants.

In order to return the operating piston 170 upwardly toward the cylinder head 162, the motor 70 is now reversed in direction for the pump 90 to produce an upward flow 128 through the operating passage 126. The low-load starting piston 134 (FIG. 3E) allows the motor 70 to start while under low mechanical loading by the pump 90 in the flow direction 128. The spring 135 normally holds this piston 134 up against the coupling element 129. Thus, as the pump 90 starts in the flow direction 128 (FIG. 3E), the corresponding discharge flow 289 from the second pump port 124 pushes the piston 134 downwardly against the relatively weak spring 135, and the liquid beneath the piston 134 exits through a transverse passage 290 (See also FIG. 4) communicating through the passage 147 into passage 146 (FIG. 4) and thus circulates back into the operating passage 126 in the direction 128. As a result of this initial permitted recirculation, the motor 70 can quickly accelerate under low load up to its operating speed before the piston 134 reaches the bottom of its cylinder 133, where it is shown in FIG. 3E. The reason for advantageously starting the motor 70 under low load when pumping in the upward direction 128 is that the lower piston 182 (FIG. 3F) on the operating piston 170 is to be drawing a vacuum in the firing chamber 180, while the pump 90 is to be pumping hydraulic liquid upwardly into the bladder reservoir 77 against ambient pressure.

In other words, while the operating piston assembly 170, 174, 182 is being moved upwardly 296 (FIGS. 6A and 7) for creating an evacuated region 300 in the firing cylinder 180, the pump 90 is performing a relatively great amount of mechanical work. This pump is reducing the pressure in the operating cylinder 168 to a sufficiently low level by the pumping flow 294 for causing the ambient pressure flow 298 acting on the annular piston surface 173 to move the operating piston assembly 170, 174, 182 upwardly, as shown by arrow 296. (Since the region 300 is evacuated and thus is essentially at zero p.s.i., there is no fluid lifting force acting on the piston 182 for helping the pump.) Thus, the pump inlet 123 (FIG. 3E) is at the markedly reduced pressure level of the flow 294 (FIGS. 6A and 7), while the pump outlet 124 is acting against the ambient pressure of bladder reservoir 77. This differential in inlet and outlet pressures causes the pump to perform a relatively great amount of mechanical work while the evacuated region 300 is being created. The longer the length of the evacuated region 300 in the firing cylinder 180 and the greater the ambient pressure, the greater the amount of mechanical work being performed by the pump 90 in creating the evacuated region 300. This mechanical work (for example measured in foot-pounds or in KiloWatt-Hours) represents the total energy which has been stored in the imploder apparatus 20 ready to produce a powerful implosion when the free-piston 140 is triggered for firing.

Induction motors such as this one draw a relatively large current when starting, and a large current flow would cause a significant voltage "drop" in the lengthy electric cable 22. For these reasons, it is advantageous for the induction motor 70 to get up to normal operating speed quickly by enabling it to start under low load immediately before commencing the vacuum drawing stroke 296 of the operating piston assembly 170, 174, 182. When running at normal operating speed, induction motors such as this one draw far less current than when starting.

By the time that the piston 134 has bottomed in the cylinder 133, the motor 70 is now up to full speed, and the pump 90 now begins to pump hydraulic liquid up into the reservoir 77, because the recirculation flow 289 (FIG. 3E) which was permitted by the downwardly moving piston 134 has been stopped by bottoming of the piston in its cylinder 133 as shown in FIG. 3E. The pumping of hydraulic liquid up into the reservoir 77 draws hydraulic liquid from the operating cylinder 168 as shown in FIG. 6A by the flow arrow 294. Consequently, the operating piston 170 (FIG. 6A) begins to move upwardly, as shown by the arrow 296, being pushed upwardly by the upward flow 298 of hydraulic liquid through the passageway 171 into the lower end of the operating cylinder 168 below the shoulder 173 of the piston head 174. This upward flow 298 is supplied by flowing hydraulic liquid from the chamber 262 within bladder 260 at ambient pressure.

It is to be noted in FIG. 6A that the decrease in volume in the upper part of the operating cylinder 168 produced by the upward piston movement 296 is greater than the increase in volume in the lower annular portion of the operating cylinder 168 below the piston shoulder 173. Thus, a larger flow 294 per second of hydraulic liquid is being pumped into the upper bladder reservoir 77 than the flow 298 being withdrawn from the lower bladder chamber 262. The difference in these two flow volumes per second is accounted for by the fact that a vacuum is now being produced in the region 300 (FIG. 6A) in the firing cylinder 180 between the lower piston head 182 of the operating piston 170 and the stationary free-moving piston 140.

As shown in FIG. 6A, the free-moving piston 140 is held in its initial position by the magnets 210 as the vacuum is being drawn in the region 300 of the firing cylinder 180 by upward movement of the operating piston assembly 170, 174, 182. Hydraulic liquid cannot enter into the region 300 through the firing ports 218, because the free piston 140 is sealed above and below these ports by the firing seals 241 and 242 (FIG. 3G).

It is now my preference to make the O.D. of the free piston 140 a very, very small amount larger at its lower end in the local periphery where it seats within the lower firing seal 242 (FIG. 3G), for example, 0.001 of an inch larger, than the remainder of its peripheral surface. This tiny difference in O.D. means that the cross-sectional area of the firing piston within the lower firing seal 242 (FIG. 3G) is about one one-hundredth of a square inch larger than the cross-sectional area within the upper firing seal 241. The hydraulic liquid at ambient pressure acting through the ports 218 thereby exerts a net force on the free piston 140 urging it toward its initial position adjacent to the holding magnets 210. For example, if ambient pressure is at 2,000 p.s.i., then this area of one one-hundredth of a square inch produces a net force of 20 pounds helping the holding magnets to hold the free piston in its initial position.

The drawing of a vacuum in the region 300 (FIG. 6A) causes the trigger rod 190 to retract, as will now be explained by first focusing on the trigger piston member 200 (FIG. 3G) and its seal 202 in sliding sealing relationship with the tubular bore 204. This bore 204 is larger in diameter than the trigger rod 190, and thus there is a shoulder 302 (FIG. 3G) on the upper face of trigger piston member 200. Inviting attention back to FIG. 6A, it is seen that this shoulder 302 is facing the vacuum 300, while the lower surface of the piston member 200 is facing hydraulic liquid at ambient pressure in the bladder chamber 262. Consequently, this ambient pressure exerts a net upward force 304 (FIG. 6A) on the piston member 200, thereby causing the retraction spring 196 to become compressed somewhat, and the reaction piston 192 becomes moved upwardly somewhat in its cylinder within the operating piston 170. This retraction of the piston 192 draws hydraulic liquid through the check valve 159 (See also FIG. 3F) and through the passage 157 into the lower end of the retraction cylinder 184. This liquid becomes temporarily trapped below retraction piston 192 by the check valve 159, thereby holding the retracted condition of the trigger rod 190 for a time as determined by slow bleed through the small orifice 163 (FIG. 3F).

As shown in FIG. 7, the withdrawal 294 of hydraulic liquid from the operating cylinder 168 causes the operating piston assembly 170, 174, 182 and retracted trigger rod 190 to continue moving upwardly 296, thereby enlarging the region of vacuum 300 in the firing cylinder 180. In FIG. 7, the operating piston assembly 170, 174, 182 has moved upwardly 296 sufficiently far to cause the retracted trigger rod 190 to bring the shoulder 302 on the trigger piston member 200 into contact with the lower end of the free-moving implosion piston 140, which is still being held stationary in its initial position by the magnets 210. Thus, the trigger piston member 200 is now on the verge of triggering the implosion firing sequence.

Continuing the upward movement 296 from FIG. 7 to FIG. 8, the trigger piston member 200 has now triggered firing of the imploder apparatus 20. It has now pulled arrows 305 the free-moving implosion piston 140 away from the holding magnet means 210. The lower end of the firing piston 140 has now separated from the lower firing seal 242 (FIG. 3G), and the hydraulic liquid under relatively high ambient pressure is now suddenly allowed to rush from bladder chamber 262 as shown in FIG. 8 by arrows 282 and 283 through the firing ports 218 into the vacuum 300 in the firing cylinder 180. This entering surge 283 of hydraulic liquid thrusts against the lower end 238 of the free piston 140 and suddenly accelerates the free-moving piston upwardly 305 toward its travel 306 in FIG. 8A, thus producing a powerful implosion transmitted by the suddenly collapsing bladder 260 (FIG. 9) into the ambient liquid in the well as shown by the sudden inward surge arrows 281.

The abrupt change in ambient pressure in the liquid 27 in the well causes the sensor 32 (FIG. 3A) to provide a sharply spiked electrical signal to indicate the instant when firing occurred.

When the operating piston assembly 170, 174, 182 comes into contact with the cylinder head 162, the withdrawal flow 294 from the operating cylinder 168 is suddenly stopped, as seen by comparing FIGS. 8 and 8A, thus stopping the upward flow 128 (FIG. 3E) and no further liquid enters the inlet 123, changing the load on the motor 70, causing a change in current and power, thereby indicating that the upward stroke of the operating piston 170 has been completed.

Since the induction motor 70 runs essentially at constant speed and since the pump 90 is of positive displacement, it is also possible to use intervals of time as the measure of when to change the rotation of the motor 70 in one direction and then in the other direction during each cycle of operation.

The operating cycle is completed, and the implosion piston can be returned to its initial position ready for another implosive firing, and so forth. The more powerful the motor 70, the shorter the intervals between successive firings can become.

It is to be noted in FIG. 6A that the net retraction force 304 on the trigger piston member 200 is directly proportional to the ambient liquid pressure. The compression spring 196 is relatively long compared with the amount of retraction, and thus the spring force of the deflected spring increases essentially linearly with deflection. As a result, advantageously, the amount of retraction of the trigger rod 190 varies, as a direct function of the ambient pressure. Consequently, at greater and greater depths in the well, the effective length of the trigger rod 190 becomes progressively shorter for decreasing the available firing stroke of the imploding piston 140 for avoiding too high peak velocities in its firing stroke. For example, the trigger rod may be shortened about one inch at 2,000 p.s.i. ambient pressure, depending upon the spring characteristic.

In the embodiment of FIG. 10, the trigger rod 190A is affixed to the operating piston 170A. Thus, the available length for the firing stroke of the free-moving implosion piston 140 remains the same, regardless of the depth to which the imploder apparatus 20 (FIG. 1) is lowered down in the ambient liquid 27.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

I claim:

1. A method of generating a powerful impulse at a depth within ambient liquid having hydrostatic pressure comprising the steps of:

positioning an impulse generating source in the ambient liquid at a depth, maintaining a free piston in an initial position within the impulse generating source, said free piston having first and second ends, providing an expandable/contractable compensating chamber filled with hydraulic liquid, exposing said compensating chamber to ambient liquid for causing hydraulic liquid in said compensating chamber to be at about ambient pressure, moving an operating piston by pumping hydraulic liquid away from the operating piston into said compensating chamber for moving said operating piston away from said first end of free piston while the free piston is being maintained in said initial position for creating a vacuum in a region between the operating piston and said first end of the free piston, triggering the impulse generating source to cause ambient liquid pressure to produce an acceleration of the free piston from said initial position with the accompanying generation of a powerful impulse by implosion, causing ambient liquid pressure to push hydraulic liquid against said second end of the free piston to produce said acceleration thereof, allowing hydraulic liquid to rush into said region ahead of said first end of the free piston as it is accelerating, causing the hydraulic liquid ahead of the free piston to damp, decelerate and arrest its imploding motion, and resetting the imploding free piston to said initial position for subsequent triggering by pumping hydraulic liquid from said compensating chamber to said operating piston for pushing said operating piston against said first end of the free piston for pushing the free piston back to said initial position.

2. A method of generating a powerful impulse at a depth within ambient liquid having hydrostatic pressure comprising the steps of:

positioning an impulse generating source in the ambient liquid at a depth, maintaining an imploding free piston in an initial position within the impulse generating source, providing an elongated tubular expandable and contractable chamber adapted to be lowered down into a well in the earth, providing hydraulic liquid in said expandable and contractable chamber, limiting the expansion of said expandable and contractable chamber by surrounding said chamber with an elongated rigid tubular support normally spaced outwardly from said chamber and having a plurality of spaced ports in said support, subjecting said chamber to ambient liquid pressure applied through said ports for pushing the hydraulic liquid against said imploding free piston, triggering the impulse generating source to cause ambient liquid pressure to cause said hydraulic liquid to produce an acceleration of the imploding free piston from its initial position with the accompanying generation of a powerful impulse by implosion, transmitting the powerful impulse by implosion from the hydraulic liquid through said expandable and contractable chamber into the ambient liquid by the sudden contraction of said chamber produced by the inward surge of the hydraulic liquid pushing the accelerating imploding free piston, controlling the sudden inward contraction of said chamber by providing an elongated rigid tubular support extending longitudinally within said expandable and contractable chamber and normally spaced inwardly from the wall of said chamber and having a plurality of spaced apertures in the wall of said tubular support, arresting the movement of the accelerated imploding free piston, and resetting the imploding free piston to its initial position for subsequent triggering.

3. The method for generating a powerful impulse at a depth within ambient liquid having hydrostatic pressure including the steps of:

positioning an impulse generating source in the ambient liquid at a depth, maintaining a free piston in an initial position within the impulse generating source, moving an operating piston away from said free piston for drawing a vacuum in a region adjacent to said free piston while it is being maintained in said initial position, providing a trigger rod extending from the operating piston to said free piston, said trigger rod moving with the operating piston as the operating piston moves away from said free piston for causing the trigger rod to move relative to said free piston while the free piston is maintained in said initial position, triggering the impulse generating source by allowing the trigger rod as it is moving with the operating piston to cause movement of the free piston toward said region where a vacuum has been drawn for allowing ambient liquid pressure to cause acceleration of said free piston into said vacuum region as a result of said movement for producing an impulse by the imploding acceleration of said free piston into said vacuum region, damping the movement of the accelerated free piston by causing the accelerated free piston to displace hydraulic liquid from between the accelerated free piston and the operating piston for preventing impact of the accelerated free piston against the operating piston, and resetting the free piston to its initial position by moving the operating piston toward said initial position for causing said resetting of the free piston in readiness for subsequent triggering.

4. A method of generating a powerful impulse at a depth within ambient liquid having hydrostatic pressure comprising the steps of:

positioning an impulse generating source in the ambient liquid at a depth, maintaining an imploding free piston in an initial position within the impulse generating source, drawing a vacuum in a region adjacent to said free piston while it is being maintained in its initial position, providing first and second expandable and contractable chambers, providing hydraulic liquid in both of said chambers, exposing both of said chambers to ambient liquid pressure for subjecting the hydraulic liquid in both chambers to ambient pressure, withdrawing hydraulic liquid out of said first chamber and pumping hydraulic liquid into said second chamber, causing the flow volume per unit time withdrawn from said first chamber to be less than the flow volume per unit time being pumped into said second chamber, and using the difference between said flow volumes for drawing the vacuum in said region, triggering the impulse generating source by producing movement of the free piston toward said region wherein a vacuum has been drawn, releasing ambient liquid pressure to produce acceleration of said free piston into said vacuum region as a result of said movement thereby generating a powerful impulse by implosion, arresting the movement of the accelerating imploding free piston, and resetting the imploding free piston to its initial position for subsequent triggering.

5. A method of generating a powerful impulse at a depth within ambient liquid having hydrostatic pressure comprising the steps of:

positioning an impulse generating source in the ambient liquid at a depth, maintaining an imploding free piston in an initial position within the impulse generating source, drawing a vacuum in a region adjacent to said free piston while it is being maintained in said initial position by moving an operating piston through a stroke length in a direction away from said free piston, triggering the impulse generating source by producing movement of the free piston toward said region wherein a vacuum has been drawn by said stroke length of the operating piston, releasing ambient liquid pressure to produce acceleration of said free piston toward the operating piston with said free piston travelling into said vacuum region as a result of said triggering movement for producing an impulse from implosion, as the ambient pressure increases decreasing said stroke length of the operating piston for thereby decreasing an available stroke length for said free piston to accelerate toward the operating piston as the ambient pressure increases for avoiding an undesired excessive acceleration of said free piston, and resetting said free piston to said initial position.

6. The method for producing an impulse at a depth within ambient liquid having ambient pressure at said depth wherein a free piston has first and second ends and a cylindrical peripheral surface, comprising the steps of:

positioning an impulse generating source in the ambient liquid at a depth and providing said free piston within said source, initially holding said free piston in an initial position within the impulse generating source, providing an enlargeable/contractible reservoir filled with hydraulic liquid and subjecting said reservoir to the ambient pressure of the ambient liquid for causing said hydraulic liquid to be at about ambient pressure, creating an evacuated region adjacent to said first end of the free piston while said free piston is held in said initial position by pumping hydraulic liquid in said source in a direction away from said evacuated region into said reservoir causing enlargement of said reservoir as said evacuated region is created, applying pressure corresponding to ambient pressure to said peripheral surface of the free piston while said free piston is held in said initial position, triggering said impulse generating source by suddenly allowing pressure corresponding to ambient pressure to push against said second end of the free piston which is opposite to said first end adjacent to said evacuated region for producing acceleration of the free piston into said evacuated region for producing said impulse, damping the movement of the accelerated free piston, and resetting the free piston to said initial position.

7. The method recited in claim 6, including the steps of:

applying ambient pressure to said peripheral surface by subjecting hydraulic liquid to ambient pressure and positioning said hydraulic liquid in contact with said peripheral surface, and triggering said impulse generating source by suddenly allowing said hydraulic liquid to contact said second end of the free piston for pushing said piston to produce said acceleration.

8. A method of generating a powerful impulse at a depth within ambient liquid having hydrostatic pressure comprising the steps of:

positioning an impulse generating source in the ambient liquid at a depth, maintaining an imploding free piston having first and second ends and a cylindrical peripheral surface in an initial position within the impulse generating source, creating an evacuated region adjacent to said first end of the free piston while said free piston is maintained in said initial position, applying pressure to said cylindrical peripheral surface by subjecting hydraulic liquid to ambient pressure and positioning said hydraulic liquid in contact with said peripheral surface, triggering said impulse generating source by mechanically moving said free piston a distance into said evacuated region for exposing said second end for allowing said hydraulic liquid under ambient pressure to contact said second end for pushing said piston to produce acceleration of said free piston into said evacuated region, damping the movement of the free piston, and resetting the free piston to said initial position.

9. The method recited in claim 8, including the steps of:

providing a plurality of passages extending through said piston between said first and second ends, allowing some of the hydraulic liquid which comes into contact with said second end to rush through said passages while the piston is accelerating for entering the evacuated region ahead of the first end of the piston, and causing said hydraulic liquid ahead of the piston to arrest the movement of the piston.

10. Imploder apparatus for producing powerful implosions within liquid wherein there is ambient hydrostatic pressure, comprising:

means for positioning the imploder apparatus at a depth within liquid where there is ambient pressure, said imploder apparatus having a firing cylinder, a free-moving piston in said firing cylinder, said free-moving piston having first and second ends, holding means for holding said free-moving piston at an initial position in said cylinder, said imploder apparatus including a reservoir for containing hydraulic liquid, said imploder apparatus including pump means, hydraulic liquid in said imploder apparatus, said pump means being arranged to pump hydraulic liquid in a direction away from said firing cylinder in said reservoir for creating evacuation of said firing cylinder while said free-moving piston is being held in said initial position, means for applying ambient pressure to hydraulic liquid in said imploder apparatus, sealing means engaging said free-moving piston while said piston is being held in said initial position for preventing said hydraulic liquid under ambient pressure from coming into contact with said first and second ends of said piston, triggering means for suddenly applying said hydraulic liquid to said second end of said free-moving piston for producing acceleration of said free-moving piston along said cylinder after evacuation thereof with said first end facing forward in the direction of travel of said free-moving piston, damping means operatively associated with said free-moving piston for arresting the travel of said free-moving piston, and said pump means being arranged to pump hydraulic liquid from said reservoir in a direction toward said firing cylinder for returning said free-moving piston to said initial position.

11. Imploder apparatus for producing powerful implosions within liquid wherein there is ambient hydrostatic pressure, comprising:

means for positioning the imploder apparatus at a depth within liquid where there is ambient pressure, said imploder apparatus having a firing cylinder, a free-moving piston in said firing cylinder having first and second ends, holding means for holding said free-moving piston at an initial position in said cylinder, evacuation means for creating evacuation of said firing cylinder, operating means for restoring said free-moving piston to its initial position, hydraulic liquid included in said imploder apparatus, means for applying ambient pressure to said hydraulic liquid, trigger means for suddenly applying said hydraulic liquid under ambient pressure to said second end of said free-moving piston for producing acceleration of said free-moving piston by implosion along said cylinder after evacuation thereof with said first end facing forward in the direction of travel of said free-moving piston, damping means for arresting the travel of said free-moving piston along said cylinder including at least one passage extending through said free-moving piston from said second end to said first end for enabling hydraulic liquid to rush through said passage into the evacuated cylinder in front of said first end for arresting travel of said free-moving piston.

12. Imploder apparatus for producing powerful implosions within liquid wherein there is ambient hydrostatic pressure, comprising:

means for positioning the imploder apparatus at a depth within liquid where there is ambient pressure, said imploder apparatus having a firing cylinder, a free-moving piston in said firing cylinder having first and second ends, holding means for holding said free-moving piston at an initial position in said cylinder, evacuation means for creating evacuation of said firing cylinder, damping means for arresting the travel of said free-moving piston, hydraulic liquid in said imploder apparatus, means for applying ambient pressure to said hydraulic liquid, trigger means for suddenly applying said hydraulic liquid under ambient pressure to said second end of said free-moving piston for producing acceleration of said free-moving piston by implosion along said cylinder after evacuation thereof with said first end facing forward in the direction of rapid travel of said free-moving piston, said free-moving piston having a cylindrical peripheral surface extending between said first and second ends, said imploder apparatus having a plurality of firing ports communicating with said cylindrical peripheral surface when said free-moving piston is in said initial position, said imploder apparatus including first and second seal means encircling said piston when in said initial position, said first seal means being in sealing relation with said peripheral surface intermediate said firing ports and said first end of the piston when said piston is in said initial position, said second seal means being in sealing relation with said peripheral surface intermediate said firing ports and said second end of the piston when said piston is in said initial position, said hydraulic liquid under ambient pressure being in contact with said peripheral surface between said first and second seal means when the piston is in said initial position, and said trigger means permitting hydraulic liquid under ambient pressure suddenly to pass said second seal means into contact with said second end of said piston for producing said acceleration of said piston.

13. Imploder apparatus as claimed in claim 12, in which:

said trigger means moves said piston with said first end being the front end with respect to the direction of movement for causing the peripheral surface of said piston to separate from sealing contact with said second sealing means for allowing said hydraulic liquid under ambient pressure to flow past said second seal means into contact with said second end of said piston for producing said acceleration.

14. Imploder apparatus as claimed in claim 12, in which:

said peripheral surface of said piston in sealing engagement with said second sealing means is larger in outside diameter than said peripheral surface in sealing engagement with said second sealing means.

15. Imploder apparatus as claimed in claim 12, in which:

said free-moving piston has at least one liquid flow passageway through said piston from said first to said second end.

16. Imploder apparatus as claimed in claim 13, in which:

said free-moving piston has at least one liquid flow passageway through said piston from said first to said second end.

17. Imploder apparatus for producing powerful implosions within liquid wherein there is ambient hydrostatic pressure, comprising:
- means for positioning the imploder apparatus at a depth within liquid where there is ambient pressure,
- said imploder apparatus having a firing cylinder,
- a free-moving piston in said firing cylinder, said free-moving piston having first and second ends,
- holding means for holding said free-moving piston at an initial position in said cylinder,
- evacuation means for creating evacuation of said firing cylinder while said free-moving piston is being held in said initial position,
- hydraulic liquid in said imploder apparatus,
- means for applying ambient pressure to said hydraulic liquid,
- sealing means engaging said free-moving piston while said piston is being held in said initial position for preventing said hydraulic liquid from coming into contact with said first and second ends of said piston,
- trigger means for suddenly applying said hydraulic liquid to said second end of said free-moving piston for producing acceleration of said free-moving piston along said cylinder after evacuation thereof with said first end facing forward in the direction of rapid travel of said free-moving piston,
- damping means operatively associated with said free-moving piston for arresting the travel of said free-moving piston,
- said imploder apparatus having first and second ends,
- a first enlargeable/diminishable chamber at said first end of said imploder apparatus exposed to the liquid pressure within which said imploder apparatus is positioned,
- a second enlargeable/diminishable chamber at said second end of said imploder apparatus also exposed to said liquid pressure,
- said first chamber being a reservoir for holding hydraulic liquid, and
- said second chamber including implosion transmitting means in communication with said second end of said free-moving piston as said free-moving piston is subject to said acceleration for transmitting an implosion into the liquid within which said imploder apparatus is positioned.

18. Imploder apparatus as claimed in claim 17, in which:
- said second chamber comprises resilient bladder means, and
- contraction-limiting means positioned within said resilient bladder means.

19. A method of generating a powerful impulse at a depth within ambient liquid having hydrostatic pressure, comprising the steps of:
- positioning an impulse generating source in the ambient liquid at a depth,
- maintaining an imploding free piston in an initial position within the impulse generating source,
- triggering the impulse generating source to cause ambient liquid pressure to produce an acceleration of the imploding free piston from its initial position with the accompanying generation of a powerful impulse by implosion,
- causing ambient liquid pressure to push hydraulic liquid against said imploding free piston to produce said acceleration thereof,
- providing a plurality of passages extending through the imploding free piston in an axial direction,
- allowing some of the hydraulic liquid pushing the imploding free piston to rush through said axial passages into a region in front of the piston as the piston is accelerating to damp, decelerate and arrest its imploding motion, and
- resetting the imploding free piston to its initial position for subsequent triggering.

20. The method of generating an implosive impulse at a depth within ambient liquid having hydrostatic pressure comprising the steps of:
- positioning an implosive impulse generating source in the ambient liquid at a depth,
- positioning a free piston in an initial position within the implosive impulse generating source,
- providing first and second enlargeable and diminishable chambers,
- providing hydraulic liquid in both of said chambers,
- subjecting the hydraulic liquid in both chambers to ambient pressure,
- withdrawing hydraulic liquid out of said first chamber and pumping hydraulic liquid into said second chamber,
- causing the flow volume per unit time of hydraulic liquid withdrawn from said first chamber to be less than the flow volume per unit time of hydraulic liquid being pumped into said second chamber,
- using difference between said flow volumes for causing an evacuation of a region adjacent to said free piston while it is in said initial position, and
- allowing the free piston to move from said initial position into said evacuated region for generating said implosive impulse.

21. The method of generating an implosive impulse as claimed in claim 20, comprising the further steps of:
- withdrawing hydraulic liquid out of said second chamber and pumping hydraulic liquid into said first chamber,
- causing the flow volume per unit time of hydraulic liquid withdrawn from said second chamber to be greater than the flow volume per unit time of hydraulic liquid being pumped into said first chamber, and
- using the difference between said flow volumes for returning the free piston to said initial position.

22. The method of generating an implosive impulse as claimed in claim 21, wherein:
- said pumping hydraulic liquid into said second chamber, and
- said pumping hydraulic liquid into said first chamber are carried out within said impulse generating source.

23. The method of generating an implosive impulse at a depth within ambient liquid having ambient hydrostatic pressure comprising the steps of:
- putting an implosive impulse generating source in the ambient liquid at a depth,
- positioning a free piston in an initial position within the implosive impulse generating source, said free piston having first and second ends,
- providing an enlargeable and diminishable chamber in said implosive impulse generating source,
- providing hydraulic liquid within said implosive impulse generating source and including hydraulic liquid within said chamber,
- within said implosive impulse generating source pumping hydraulic liquid from said chamber for moving an operating piston away from said first end of the free piston remaining in said initial position for evacuating a region within said implosive impulse generating source adjacent to said first end of the free piston remaining in said initial position, triggering the free piston for causing hydraulic liquid under ambient pressure to push against said second end of the free piston to produce acceleration of the free piston into said evacuated region for generating an implosive impulse, and within said implosive impulse generating source pumping hydraulic liquid into said chamber for moving the operating piston to push against said first end of the free piston for resetting the free piston to said initial position.

24. Imploder apparatus for producing implosive impulses within ambient liquid wherein there is hydrostatic pressure, said imploder apparatus being adapted to be submerged within ambient liquid and comprising:

a firing cylinder,
a free-piston movable in said firing cylinder,
said free-piston having first and second ends,
said free-piston having an initial position in said firing cylinder,
said imploder apparatus containing hydraulic liquid,
pump means within said imploder apparatus,
a movable member in communication with said firing cylinder,
said pump means being operable for pumping hydraulic liquid in a first direction within said imploder apparatus for moving said movable member for evacuating a region of said firing cylinder near said first end of said free-piston with said free-piston remaining in said initial position,
movable means exposed to ambient liquid and being in communication with hydraulic liquid in said imploder apparatus for applying ambient pressure to such hydraulic liquid for putting such hydraulic liquid under ambient pressure,
trigger means in said imploder apparatus for applying such hydraulic liquid under ambient pressure to said second end of said free-piston after said region has been evacuated for accelerating said free-piston into said evacuated region of the firing cylinder with said first end of the accelerating free-piston being the front end,
the accelerating free-piston allowing hydraulic liquid in communication with said movable means to flow in a direction away from said movable means for producing an implosive impulse in the ambient liquid, and
said pump means being operable for pumping hydraulic liquid in a second direction within said imploder apparatus for moving said movable member for returning the free-piston back to said initial position.

25. Imploder apparatus as claimed in claim 24, in which:

said movable member in communication with said firing cylinder is an operating piston in said firing cylinder facing toward said first end of said free-piston, said pump means is operable for pumping hydraulic liquid in a first direction within said imploder apparatus for moving said operating piston in a direction away from said first end of said free-piston for evacuating a region of said firing cylinder near said first end of said free-piston, and said pump means is operable for pumping hydraulic liquid in a second direction within said imploder apparatus for moving said operating piston in a direction toward said first end of the free-piston for returning the free-piston back to said initial position in said firing cylinder.

26. Imploder apparatus as claimed in claim 25, further comprising:

sealing means engaging the free-piston in said initial position for preventing such hydraulic liquid under ambient pressure from coming in contact with said second end of said free-piston, said trigger means comprising a trigger rod moved by said operating piston and extending to said free-piston in said initial position, said trigger rod causing movement of said free-piston away from said sealing means for allowing such hydraulic liquid under ambient pressure to come into contact with said second end of the free-piston for accelerating said free-piston into said evacuated region of said firing cylinder after said region near said first end of said free-piston has become evacuated by movement of said operating piston in a direction away from said first end of said free-piston.

27. Imploder apparatus as claimed in claim 26, in which:

said free-piston has an axially extending bore therein,
said trigger rod extends into said bore,
said trigger rod is movable relative to said bore as said operating piston is moving in the direction away from said first end of said free-piston, and
said trigger rod has a laterally extending protrusion engageable with said free-piston for causing movement of said free-piston away from said sealing means after said region near said first end of said free-piston has become evacuated.

28. Imploder apparatus as claimed in claim 26, further comprising:

retraction means responsive to hydrostatic pressure of ambient liquid for retracting said trigger rod relative to said operating piston in response to hydrostatic pressure exceeding a predetermined limit.

29. Imploder apparatus as claimed in claim 24, further comprising:

said pump means including a reversible positive displacement pump within said imploder apparatus and a reversible electric motor within said imploder apparatus coupled to said pump for driving said pump, said pump means being driven in a first direction by said electric motor for pumping hydraulic liquid in said first direction within said imploder apparatus, and said pump means being driven in a second direction by said electric motor for pumping hydraulic liquid in said second direction within said imploder apparatus.

30. Imploder apparatus as claimed in claim 29, including:

low-load starting means within said imploder apparatus associated with said reversible positive displacement pump for enabling said reversible electric motor to get up to operating speed before pumping hydraulic liquid in said first direction within said imploder apparatus for moving said movable member for evacuating said region.

31. Imploder apparatus as claimed in claim 30, in which:
said reversible positive displacement pump includes first and second ports,
said first port serves as an inlet port and said second port serves as an outlet port as said pump is pumping hydraulic liquid in said first direction in said imploder apparatus, and
said low-load starting means comprises means defining a recirculation path from said second port to said first port,
a low-load starting element communicating with said second port, and
said low-load starting element is movable from a first position wherein said recirculation path is open to a second position wherein said recirculation path is blocked, and
said low-load starting element is moved from said first position to said second position as said pump begins to be driven in said first direction for enabling said reversible electric motor to get up to operating speed before pumping hydraulic liquid in said first direction within said imploder apparatus for moving said movable member for evacuating said region.

32. Imploder apparatus as claimed in claim 24, including:
low-load starting means within said imploder apparatus associated with said pump means for enabling said pump means to get up to operating speed before pumping hydraulic liquid in said first direction within said imploder apparatus for moving said movable member for evacuating said region.

33. Imploder apparatus as claimed in claim 32, in which:
said pump means includes first and second ports,
said first port serves as an inlet port and said second port serves as an outlet port as said pump means is pumping hydraulic liquid in said first direction within the imploder apparatus, and
said low-load starting means comprises means defining a recirculation path from said second port to said first port,
a low-load starting element within the imploder apparatus communicates with said second port,
said low-load starting element is movable from a first position wherein said recirculation path is open to a second position wherein said recirculation path is blocked, and
said low-load starting element is moved from said first position to said second position as said pump means begins operating for enabling said pump means to get up to operating speed before pumping hydraulic liquid in said first direction within said imploder apparatus for moving said movable member for evacuating said region.

34. Imploder apparatus as claimed in claim 29, in which:
said electric motor has a rotor on a rotatable motor shaft,
said reversible positive displacement pump has a pump shaft,
coupling means couples said motor shaft to said pump shaft for said motor to drive said pump,
said coupling means permits axial movement of said pump shaft and motor shaft relative to each other, and
damping means connected to said motor shaft for protecting the rotor from axial jerking during the producing of an implosive impulse.

35. Imploder apparatus as claimed in claim 34, in which said damping means comprises:
a damper piston secured to the motor shaft,
said damper piston having an end,
a partition rigidly mounted in said imploder apparatus in spaced relationship to said end of said damper piston for defining a dash pot region therebetween,
hydraulic liquid in the dash pot region between said partition and said end of said damper piston, and
means for defining a small clearance in communication with said dash pot region for permitting restricted flow of hydraulic liquid relative to said dash pot region.

36. Imploder apparatus as claimed in claim 24, in which:
said pump means includes first and second ports,
said first port serves as an outlet port and said second port serves as an inlet port as said pump means is pumping hydraulic liquid in said second direction within the imploder apparatus,
means defines a recirculation path within the imploder apparatus from said first port to said second port,
a pressure-relief valve within the imploder apparatus communicates with said first port,
said pressure-relief valve is movable from a first position in which said recirculation path is blocked to a second position in which said recirculation path is open, and
said pressure relief valve is moved from said first position to said second position upon the free-piston becoming returned to said starting position for permitting recirculation flow of hydraulic liquid from said first port to said second port for relieving pressure in said first port.

37. Imploder apparatus for producing implosive impulses within ambient liquid wherein there is hydrostatic pressure, said imploder apparatus being adapted to be submerged within ambient liquid and comprising:
means defining an evacuatable region within the imploder apparatus,
a movable member within the imploder apparatus communicating with said evacuatable region,
means defining first and second chambers within the imploder apparatus,
hydraulic liquid within the imploder apparatus and being within said first and second chambers,
pump means within the imploder apparatus communicating with said first and second chambers,
said pump means being operable for pumping hydraulic liquid from said first chamber and for pumping hydraulic liquid to said second chamber,
means for causing the flow volume per unit time of hydraulic liquid from said first chamber to be less than the flow volume per unit time of hydraulic liquid to said second chamber,
said movable member within the imploder apparatus being in communication with the hydraulic liquid within the imploder apparatus and being moved in response to difference between said flow volumes for evacuating said region, and
releasable means within the imploder apparatus movable toward said region following evacuation of said region for producing an implosive impulse.

38. Imploder apparatus as claimed in claim 37, in which:
- said pump means within the imploder apparatus includes a reversible positive displacement pump and a reversible electric motor within the imploder apparatus coupled to said pump for driving said pump,
- said electric motor is in communication with the hydraulic liquid within the imploder apparatus, and
- said pump means during operation pumping hydraulic liquid past said electric motor for cooling said motor.

39. Imploder apparatus as claimed in claim 38, in which:
- hydraulic liquid within the imploder apparatus is subjected to ambient hydrostatic pressure, and
- hydraulic liquid subject to ambient hydrostatic pressure is within the electric motor for pressure compensating the motor relative to ambient hydrostatic pressure.

40. Imploder apparatus as claimed in claim 37, in which:
- said movable member within the imploder apparatus is an operating piston having first and second ends,
- said first end is larger in diameter than said second end,
- said first end is movable in a first cylinder,
- said second end is movable in a second cylinder,
- said operating piston has an annular shoulder between said first and second ends,
- said annular shoulder is in communication with said first cylinder,
- said means for causing the flow volume per unit time of hydraulic liquid flow from said first chamber to be less than the flow volume per unit time of hydraulic liquid to said second chamber comprising said annular shoulder of said operating piston being in communication with said first chamber and said first end of said operating piston being in communication with said second chamber and said first end having a larger cross-sectional area than said annular shoulder,
- said second cylinder defines said evacuatable region,
- said operating piston is moved in a first direction in response to difference in flow volumes for moving said second end in said second cylinder for evacuating said evacuatable region defined by said second cylinder.

41. Imploder apparatus as claimed in claim 40, in which:
- hydraulic liquid in said first and second chambers is subject to hydrostatic pressure of the ambient liquid,
- said releasable means has an initial position within the imploder apparatus,
- said releasable means is moved toward said region by hydraulic liquid subject to hydrostatic pressure,
- said pump means is operable for pumping hydraulic liquid from said second chamber and for pumping hydraulic liquid to said first chamber for moving said operating piston in a second direction for returning said releasable means to said initial position, and
- said cross-sectional area of said first end of said operating piston is substantially equal to the sum of the cross-sectional areas of said annular shoulder and said second end of said operating piston for substantially balancing forces of hydraulic liquid acting upon said operating piston as said operating piston is moving in said second direction for returning said releasable means to said initial position for enabling said pump means to perform modest work in moving said operating piston in said second direction.

* * * * *